United States Patent
Mohindra

(10) Patent No.: US 9,001,066 B2
(45) Date of Patent: Apr. 7, 2015

(54) PAPR OPTIMIZED OFDM TOUCH ENGINE WITH TONE SPACED WINDOWED DEMODULATION

(71) Applicant: Rishi Mohindra, Milpitas, CA (US)

(72) Inventor: Rishi Mohindra, Milpitas, CA (US)

(73) Assignee: Rajkumari Mohindra, Milpitas, CA (US)

( * ) Notice: Subject to any disclaimer, the term of this patent is extended or adjusted under 35 U.S.C. 154(b) by 122 days.

(21) Appl. No.: 13/887,373

(22) Filed: May 6, 2013

(65) Prior Publication Data

US 2014/0327644 A1 Nov. 6, 2014

(51) Int. Cl.
G06F 3/044 (2006.01)
G06F 3/041 (2006.01)

(52) U.S. Cl.
CPC ............. *G06F 3/044* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 5,548,236 | A * | 8/1996 | Cooper et al. | 327/237 |
| 2002/0080728 | A1* | 6/2002 | Sugar et al. | 370/252 |
| 2002/0185608 | A1* | 12/2002 | Wieser | 250/458.1 |
| 2005/0186958 | A1* | 8/2005 | Hansen et al. | 455/426.2 |
| 2005/0259568 | A1* | 11/2005 | Yeh et al. | 370/208 |
| 2007/0275675 | A1* | 11/2007 | Darabi et al. | 455/118 |
| 2008/0116904 | A1* | 5/2008 | Reynolds et al. | 324/678 |
| 2010/0228810 | A1* | 9/2010 | Han et al. | 708/322 |
| 2012/0056841 | A1* | 3/2012 | Krenik et al. | 345/174 |
| 2012/0287055 | A1* | 11/2012 | Cheng | 345/173 |

FOREIGN PATENT DOCUMENTS

CN 101959289 A * 7/2013 .......... H04W 52/00

\* cited by examiner

*Primary Examiner* — William Boddie
*Assistant Examiner* — Bipin Gyawali

(57) ABSTRACT

A touch-sensitive device includes a touch panel, drive unit, and measurement unit. A touch applied to a given node of the panel changes a mutual capacitive coupling between a given drive and sense electrode of the touch panel, or changes a self-capacitive coupling the between a given electrode and ground. The drive unit delivers to the drive electrodes of the touch panel or to the self-capacitance measurement amplifiers of all electrodes, subcarriers of a composites carrier modulated OFDM signal by using SSB or DSB modulation based up-conversion, and these subcarriers are complementary code sequence-based phase encoded for PAPR reduction of the OFDM signal. The measurement unit receives signals from the receive electrodes, or directly from local receiver amplifiers at each electrode, and analyzes the signal using FFT or maximum likelihood estimation to determine the mutual coupling capacitance between each of the drive and receive electrodes or the self-capacitance of each electrode. Time-windowing is applied inside the FFT window, and a tone skipping or nulling technique is adopted, when it is required to reject interferences at frequencies that are too close to that of the drive signal frequencies.

20 Claims, 15 Drawing Sheets

PAPR OPTIMIZED OFDM TOUCH ENGINE WITH TONE SPACED WINDOWED DEMODULATION

RELATED APPLICATIONS

This application claims the benefit of U.S. Patent Provisional Application No. 61/654,851, filed Jun. 2, 2012, and titled "PAPR OPTIMIZED OFDM TOUCH ENGINE WITH TONE SPACED WINDOWED DEMODULATION," which is herein incorporated by reference in its entirety.

The present application is related to United States patent application US 2011/0084857 A1, published Apr. 14, 2011, for MULTITOUCH TOUCH DEVICE WITH MULTIPLE DRIVE FREQUENCIES AND MAXIMUM LIKELIHOOD ESTIMATION, included by reference herein.

The present application is related to United States patent application US 2010/00860593 A1, published Mar. 11, 2010, for PHASE COMPENSATION FOR MULTI-STIMULUS CONTROLLER, included by reference herein.

The present application is related to U.S. Pat. No. 5,862,182, issued Jan. 19, 1999, for OFDM DIGITAL COMMUNICATIONS SYSTEMS USING COMPLIMENTARY CODES, included by reference herein.

FIELD OF THE INVENTION

This invention relates generally to touch-sensitive devices, particularly those that rely on a capacitive coupling between a user's finger or other touch implement and the touch device, with particular application to such devices that are capable of detecting multiple touches applied to different portions of the touch device at the same time.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

There are two known techniques used to capacitively measure touch. The first is a "self-capacitance" method to measure capacitance-to ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling. This second technique is called "mutual capacitance" method.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. Drive signals can be transmitted through the drive lines, resulting in signal capacitances at the crossover points (sensing pixels) of the drive lines and the sense lines. The signal capacitances can be determined from sense signals that are generated in the sense lines due to the drive signals. In some touch sensor panel systems, multiple drive lines are stimulated simultaneously to generate composite sense signals in the sense lines. While these systems offer some advantages, conventional multi-stimulus systems can cause difficulties. For example, in a typical multi-stimulus system, different drive lines can introduce different phase delays in the sense signals of a sense channel, which can result in reduced efficiency in processing the sense signals.

Within the context of the second technique, various additional techniques have been used to measure the mutual capacitance between electrodes. Each of these techniques has its own capabilities, limitations, and other characteristics, and associated advantages and disadvantages from standpoints such as performance, speed, complexity, cost, and so forth. Moreover, the question of whether a characteristic of a given technique is deemed to be an advantage or disadvantage may depend on the goals of the system designer. For example, the designer of a relatively small touch screen system with low resolution and requiring only one touch detection at a time may consider a characteristic of a given sensing technique to be advantageous, while a designer of a larger touch screen system requiring high resolution and multiple simultaneous touch capability may consider the same characteristic to be a disadvantage.

United States patent application US 2010/00860593 A1, published Mar. 11, 2010, for PHASE COMPENSATION FOR MULTI-STIMULUS CONTROLLER, discloses an elaborate method to mitigate the phase variation over the panel, while United States patent application US 2011/0084857 A1, published Apr. 14, 2011, for MULTITOUCH TOUCH DEVICE WITH MULTIPLE DRIVE FREQUENCIES AND MAXIMUM LIKELIHOOD ESTIMATION overcomes that problem by using baseband orthogonal frequency division multiplexed (OFDM) tones to excite the panel. However this latter prior art raises other serious problems like the ability to handle large peak to average power ratio (PAPR) of the sense signal that has all the drive signals added up, and therefore to avoid saturation of the sense amplifiers, the dynamic range of these amplifiers need to be increased by 10 to 20 dB or even more compared to single carrier systems, for supporting large number of drive channels. This can result in very significant increase in total current consumption of the sense amplifiers and the subsequent analog signal processing chain, making the product uncompetitive.

Interference rejection is another serious issue involving touch controllers. Single carrier systems tend to have a wider signal bandwidth and need to be frequency agile in order to be sufficiently far from interfering frequencies. However it may not always be possible to find the sweet spot for operation as the signal bandwidth may be too wide to avoid multiple interference tones simultaneously. The signal bandwidth is usually inversely proportional to the integration time of a correlation receiver, and making the signal bandwidth very narrow would lead to long integration time in the receiver, resulting in unacceptably low update rates i.e. frame rate of a touch device. Baseband OFDM systems of prior art have subcarrier frequencies at a spacing of $\Delta f$, starting from 0 Hz and ending at half the sampling frequency Fs/2. They require a very large fast Fourier transform (FFT) size of N that is equal to the twice the operational frequency span divided by the frequency resolution i.e. $N=Fs/\Delta f$. The operational frequency span needs to cover a very wide spectrum range, always starting from 0 Hz and ending at half the sampling frequency, even though the actual frequency band of operation i.e. frequencies of actually used subcarriers, may usually be a much smaller frequency range closer to the upper end of the operational frequency range of Fs/2, than to 0 Hz. The frequency resolution $\Delta f$ which is the inverse of the FFT period $T_{FFT}$, is equal to the tone spacing that needs to be sufficiently small in order to find the required number of clean tones that are sufficiently separated from multiple interference tones that may be present in a system e.g. due to LCD display noise or Charger Noise. Also it is desirable to have the clean tones clustered together so that they have similar group delay over the capacitive touch screen panel. As an example, if only 24 clean tones are spread out over 32 consecutive FFT bins just below 500 kHz, with a 500 Hz tone spacing, the prior art will require an FFT size of 2048 (nearest power of 2 greater than 2*500 kHz/500 Hz) instead of just 32, at a 1024 kHz sampling frequency Fs. Large FFT sizes consume more power and require a higher sampling speed.

It may also be desirable to support both mutual capacitance and self-capacitance at the same time without having to time multiplex between the two modes in order to support the required frame rates for regular touch with a good signal to noise ratio (SNR). Known techniques today do not offer this capability.

Support for passive stylus requires a very high density of drive and sensor electrodes and existing signal processing techniques may be too expensive or consume too much power to support this requirement.

Support for large touch panels will require cheap and high resistance ITO layers that result in large amplitude attenuation over the panel along with large phase shifts. The resistance increases due to the increased length of the ITO electrodes for larger touch panels.

SUMMARY

In view of the foregoing, a multi-stimulus controller for a multi-touch sensor is disclosed for overcoming these drawbacks of prior art: large phase shifts over touch panels, large signal buildup at sensors, poor immunity to interference due to limited frequency space availability, inability to support both self and mutual capacitance simultaneously at the required frame rate with sufficient SNR, the inability to support passive stylus, and the inability to support cheap large panels.

According to this invention, an equivalent carrier modulated OFDM signal is used to excite the capacitive touch panel, and if required, this can be done simultaneously for both mutual and self-capacitance, as will be shown in an embodiment. The advantage of carrier modulated OFDM signal is that large FFT sizes are not required if the carrier frequency is made agile i.e. programmable, and is able to cover a required frequency range. Each drive electrode is statically or dynamically allocated one or more distinct positive baseband tone frequency $f_k=(k-1)*\Delta f$ with $1<=k<=N$ where k is an integer index assigned to each drive electrode.

The range of $f_k$ tone frequency is from 0 Hz to $(N-1)*\Delta f$, such that the tone frequencies are integer multiples of a frequency spacing $\Delta f$. Alternatively, both negative and positive baseband tone frequency could be used, in which case $f_k$ would be covering a range of $-(N/2)*\Delta f$ to $+(N/2-1)*\Delta f$ in steps of $\Delta f$, and the corresponding range of k would be $-N/2<=k<=N/2-1$, with k integer. The value of N is usually a power of 2, and is equal to the size of the base FFT, and is much smaller than that of the Baseband OFDM system of prior art that required a large value of N given by $N=Fs/\Delta f$. According to this invention, the baseband tone frequencies $f_k$ are up converted using a common carrier frequency $f_c$, and the up-converted tone frequencies comprise the un-modulated subcarriers of the composite carrier modulated OFDM signal. The $k^{th}$ subcarrier frequency is at $f_c+f_k$. Complex up-conversion using quadrature mixing results in a single sideband modulation (SSB) and is mathematically given by the following equation for the $k^{th}$ subcarrier of the carrier modulated OFDM signal:

$$V_k(t)=\text{real}[e^{j2\pi f_k t}*e^{j2\pi f_c t}]=\text{real}[e^{j2\pi(f_k+f_c)t}]=\cos[2\pi(f_k+f_c)t]$$

Instead of selecting the real component in the above equation, the imaginary component could be used alternatively.

In a preferred embodiment a much simpler double sideband modulation (DSB) is performed using real multiplication with a single phase carrier. With double sideband modulation, each drive electrode will occupy at least two frequency tones that are equally spaced above and below the carrier frequency as shown below.

$$V_k(t)=\cos(2\pi f_k t)*\cos(2\pi f_c t)=0.5\{\cos[(f_c-f_k)]+\cos[(f_c+f_k)]\}$$

This allows the carrier frequency to operate closer to the upper frequency limits of the panel where the tones above the carrier could result in significant attenuation due to panel frequency response. However, because each drive electrode also has a subcarrier tone below the carrier, less than half the power would be lost at the most. Using complex down conversion to baseband at each sensor will give access to both the upper and lower sideband information for each drive electrode. In addition, if one of the sideband tone is jammed due to interference at that particular frequency, then the other sideband tone can still be used for touch decoding.

In one embodiment, the drive signals are periodically switched off while a spectral analysis is performed at the sensor electrodes using an FFT process. Interference frequencies are identified around the carrier within the FFT bandwidth, and these frequencies are then not allocated to the drive electrodes. The FFT size used is larger than the number of drive electrodes in order to have spare subcarriers that are also reasonably separated from the interfering signals. This frequency separation can be significantly reduced based on the embodiment described next.

In another embodiment, time windowing is performed inside the FFT period. An example of the time windowing is the multiplication of the FFT time-samples with a Hann Window of same length as the FFT time-samples. This time windowing enables the occupied band of the OFDM signal to be very close to interfering frequencies without having noticeable impact on the SNR. Time windowing creates inter-carrier interference (ICI) among adjacent subcarriers due to broadening of the main lobe of each of their spectrum. In order to overcome this, every fourth subcarrier is allocated to a drive electrode, and the FFT size is increased by a factor four. This results in insignificant ICI even for very severe windowing that is fully contained inside each FFT period. The combination of windowing and subcarriers skipping allows strong interfering signals to occupy frequencies inside the OFDM band. This technique drastically improves the interference immunity of a multi-touch sensing system. The time windowing is a multiplication of a window function (e.g. a Hann window) with the time-samples. It can also be implemented in the frequency domain by convoluting the FFT of the Hann window with the FFT of the time-samples.

While the above mentioned embodiments using specially modified OFDM signals offer great advantages, an inherent drawback of OFDM signals is that they have a very large peak to average power ratio (PAPR) that can exceed 20 dB for large number of drive electrodes. Such a system is not feasible for handheld products that are sensitive to battery life, since the sensor amplifier would require a huge dynamic range resulting in significant increase in power consumption. An embodiment of the patent is to reduce the dynamic range requirement of the OFDM signal from a very large value to just 3 dB. This is done by phase encoding each active subcarrier tone (that is used by a drive electrode) with a predetermined value that is based on a complimentary code sequence. If the number of drive electrodes are a power of two, then the peak to average ratio of the composites signal as seen by each sensor amplifier is only 3 dB if the tone allocation is done monotonically and uniformly (independent of the number of null tones between active subcarriers). Even if the number of drive electrodes is not a power of two, the PAPR is only a few dB larger. In another embodiment of the patent, a search is made over the complimentary code sequence to find the lowest PAPR when the number of drive electrodes is not a power of two. A major advantage of using complimentary code sequence based phase encoding is that even with large phase shifts over the panel the PAPR does not increase significantly.

For touch decoding it is only required to track the changes in the mutual or self-capacitance relative to a longer term averaged value that corresponds to the case when there is no touch. Therefore the touch decoding would not be affected if a fixed amount of signal is added or subtracted at each subcarrier frequency that is injected onto a sensor line through the mutual capacitance of the corresponding drive electrode. This is because the FFT operation on the time domain OFDM signal at the sensor is a linear operation for extracting the individual signal levels at each subcarrier. An embodiment of this patent is to subtract from the composites OFDM signal that is sensed by each of the amplifier at the sensor electrodes, an equal and opposite OFDM signal that is stored in memory. This subtracted signal could be common to all the sensor amplifiers, or could be individually set for each amplifier. This subtraction may work well for small PAPR and may not work well for large PAPR since large spikes in the OFDM signal may have larger phase variations that may be more difficult to accurately predict and subtract. Another embodiment of the patent is to combine the PAPR reduction of the OFDM signal along with the subtraction of the stored OFDM waveform that closely resembles the non-touch panel signal at the input of the sensor amplifier.

One of the limitations of OFDM is the requirement of rather low levels of phase noise even at very small offsets from the carrier frequency (e.g. down to 5% of tone spacing from the subcarrier). In one embodiment of the patent the same carrier signal is used for the drive electrodes as well as for the sensor down conversion to baseband or for the sampling of the sensor signal. This allows the receiver carrier phase to track the transmit carrier phase without using conventional carrier phase tracking and phase locked loops to clean up the close-in phase noise. The delay between the transmit carrier and the receive carrier is deliberately kept at zero so that the phase noise cancels out. In the prior art the receive carrier is delayed to compensate for the panel phase shifts. Even the transmit drive electrodes are sometimes appropriately delayed to compensate for the phase variation along the sensor trace. Using OFDM there is no need for this delay compensation and the drive electrode and the sensor electrode carrier phases can be kept at zero-phase relative to an internal reference carrier phase. This does not affect the operation of quadrature demodulation at the sensor if the quadrature local oscillators are generated from a lookup table instead of delaying one with respect to the other. If an analog oscillator (e.g. a Voltage Controlled Oscillator) is directly used for the transmitter up-conversion and receiver down-conversion, then a high-frequency LC (inductance-capacitance) oscillator can be frequency or phase locked to a reference frequency source, and optionally followed by a divide-by-N where N could end in a divide-by-2 to generate quadrature carriers. The frequency divider will give 6N dB improvement in phase noise relative to the original LC oscillator phase noise.

For supporting usage of a 1 mm-2 mm tip passive stylus, an option is to have a high density of drive electrodes and sensor electrodes e.g. using a 2.5 mm electrode pitch. This can result in a huge number of electrodes but they can be easily supported using the above-mentioned OFDM techniques. In one embodiment of the patent, every alternating drive electrode (e.g. even numbered electrodes) is excited in even numbered frames (or sub-frames), while the other set of alternating drive electrodes (e.g. odd numbered electrodes) are excited in odd frames (or sub-frames). This reduces the number of required subcarrier frequencies by a factor two, reducing the complexity of the FFT engine and the touch controller integrated circuit. In another embodiment, when a stylus is detected or the device is put into a stylus mode, only the drive electrodes around the stylus touch area are excited. This allows higher drive levels for the active drive electrodes and results in a large improvement in SNR for the passive stylus. The position of the passive stylus can be tracked easily if the stylus is not moving fast, in order to selectively turn on the required drive electrodes with a few frames of delay in the closed loop tracking. However if the stylus is moving fast, then a predictive algorithm can be used to turn on the drive electrodes in anticipation of the future position of the stylus (i.e. to compensate for the loop delay).

In another embodiment of the patent, instead of increasing the drive level of the active electrodes that follow a region of interest around the passive stylus, more subcarriers could be allocated to those electrodes. This can help with interference mitigation through frequency diversity. PAPR could be reduced for these electrodes using complimentary code based phase encoding, thereby maximizing the electrode drive level when it uses multiple subcarriers.

In another embodiment of the patent, both self and mutual capacitance are sensed simultaneously in order to support passive stylus while at the same time enable regular touch detection without having to change the operating mode manually between a touch mode and a stylus mode. The self-capacitance would be primarily used to detect the passive stylus, and the information from the mutual capacitance can be used to enhance the touch accuracy especially if the drive electrodes are selectively turned on and made to track the passive stylus. The limitation of self-capacitance is that it only works reliably for a single touch, but this is not an issue with stylus.

In another embodiment of the patent, both self and mutual capacitance are sensed simultaneously either at full frame rate or a lowered frame rate. The mutual capacitance could be made to operate at full frame rate in a limited region of interest (like the power-on slider of iPhone), while the self-capacitance could be used for proximity detection to increase the frame rate of the mutual capacitance sensing when proximity is detected.

According to this invention, a separate set of OFDM subcarrier tones are allocated for the self-capacitance measurement. It is easy to simultaneously measure the self-capacitance of the sensor electrodes while it is being used to measure the mutual capacitance. As an example, the sensor electrode is connected to the inverting input of an operational amplifier (Op Amp) that has a capacitive feedback in order to implement a charged coupled amplifier or a current to voltage converter. The inverting input instead of being directly connected to ground (e.g. mid supply voltage or reference voltage), it is driven by a self-capacitance subcarrier tone signal. The Op amp output at this frequency would indicate the capacitance to ground, thereby enabling the measurement of self-capacitance. Since this subcarrier frequency is orthogonal to all other subcarriers that are being used, it can be independently detected through the FFT simultaneously with the mutual capacitance subcarrier frequencies that are coupled through the mutual capacitance with the drive electrodes.

For two-dimensional positioning of stylus using self-capacitance, it is required to convert the drive electrodes into self-capacitance sensor electrodes. A set of orthogonal subcarrier tones are allocated to the drive electrodes for the self-capacitance mode. Each row driver output also has a sensor amplifier input connected to it. The row driver for self-capacitance measurement is designed to be a high impedance current source output that injects current into the drive electrodes. The sensor amplifiers connected to the drive electrodes measure the drive voltages of these electrodes from which the self-capacitance of the drive electrode can be estimated. For each drive electrode, the output of its sensor amplifier at its allocated self-capacitance subcarrier frequency would indicate that capacitance to ground at the drive electrode terminal thereby enabling the measurement of the self-capacitance of that electrode.

DRAWINGS

Figure 10:
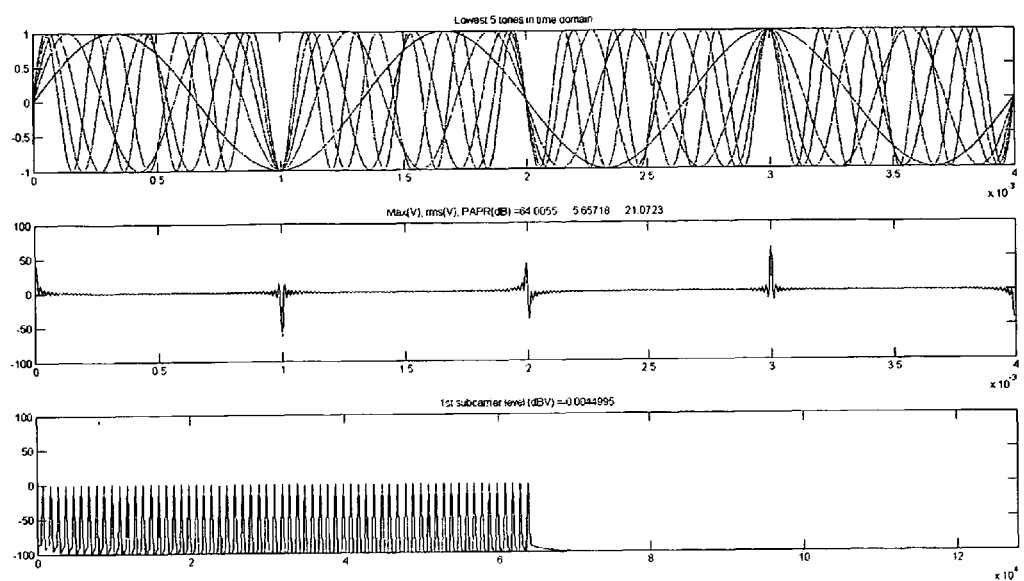

FIG. 10 shows a plot of only a few subcarrier waveforms in the top graph. The middle graph shows the composite OFDM waveform for 64 used-subcarriers with three null-tones between consecutive used-subcarriers, and 250 Hz subcarriers spacing. The bottom graph shows the spectrum of the OFDM signal of the middle graph.

Figure 11:
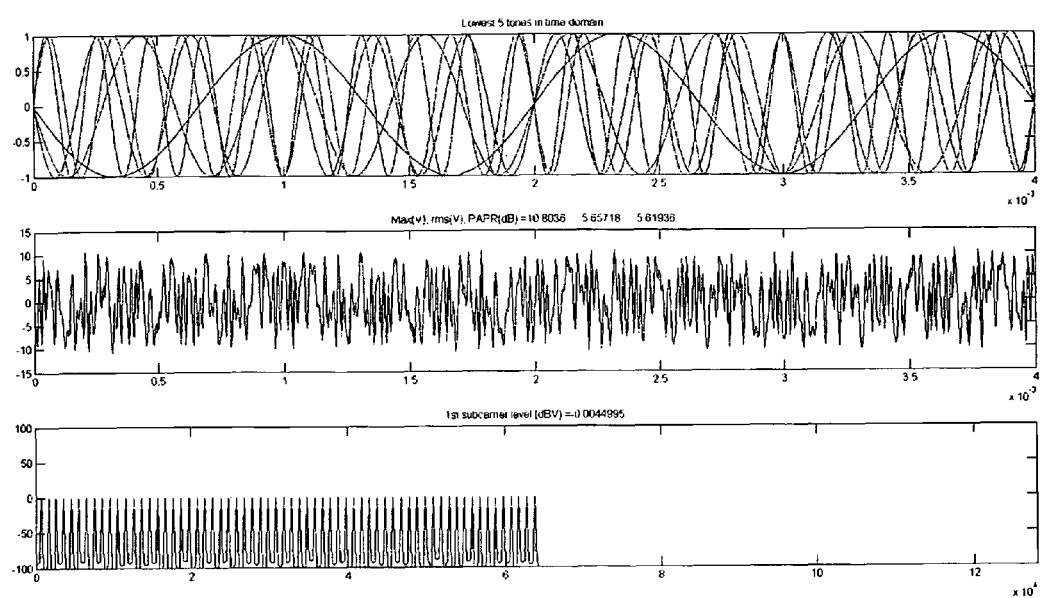

FIG. 11 shows a similar plot as FIG. 10, but with PAPR reduction turned on, as per embodiments of the patent.

Figure 12:
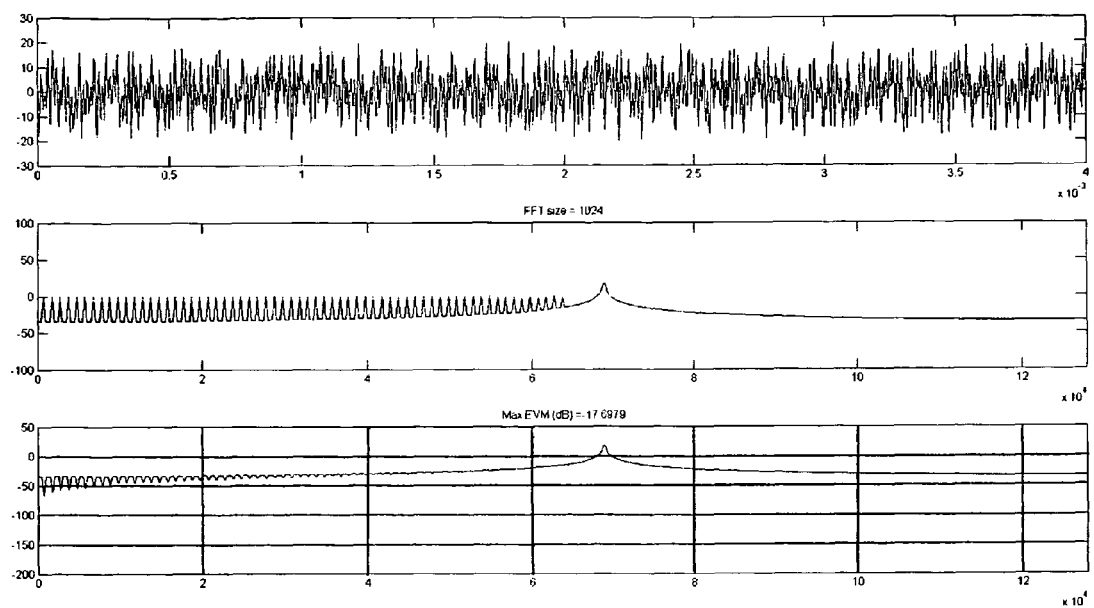

FIG. 12 shows an error vector magnitude (EVM) plot (bottom graph) when an interfering tone is present at 20.5 subcarriers-spacing above the highest used subcarrier. A spectrum of the OFDM signal along with the interfering signal is shown in the middle graph. A time domain waveform of the signal is shown in the top graph for one FFT period.

Figure 13:
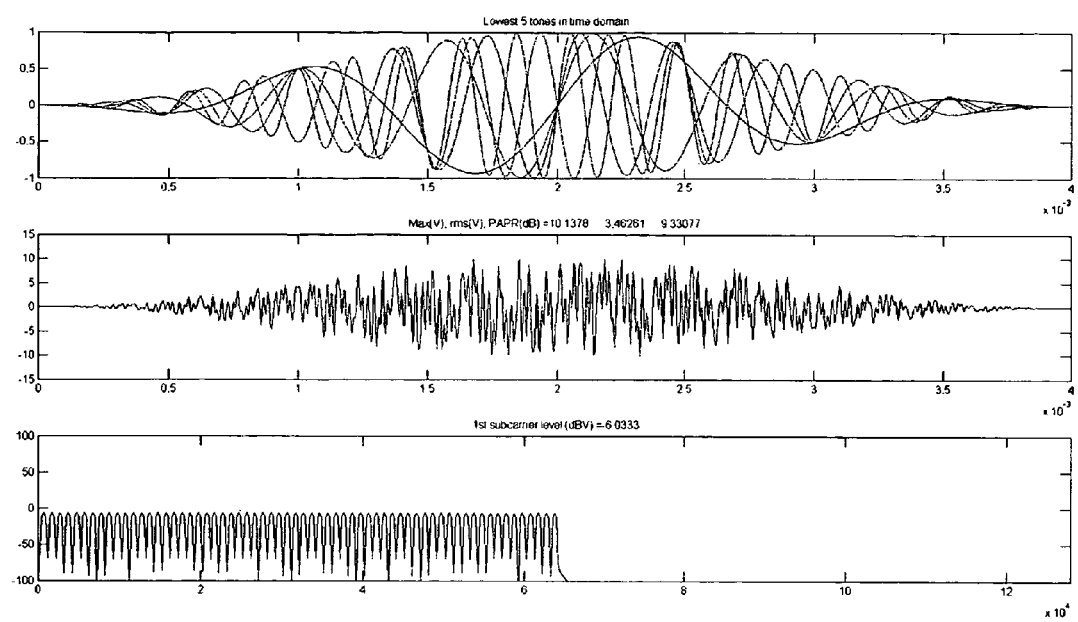

FIG. 13 is a plot of the OFDM signal at the input of the receiver FFT block when time windowing is turned on within the FFT period as per embodiments of the patent. The bottom graph shows the spectrum of the OFDM signal for 64 used-subcarriers with three null-tones between consecutive used-subcarriers, and 250 Hz subcarriers spacing. The middle graph shows the time domain OFDM signal. The top graph plots a few subcarriers of the OFDM signal.

Figure 14:
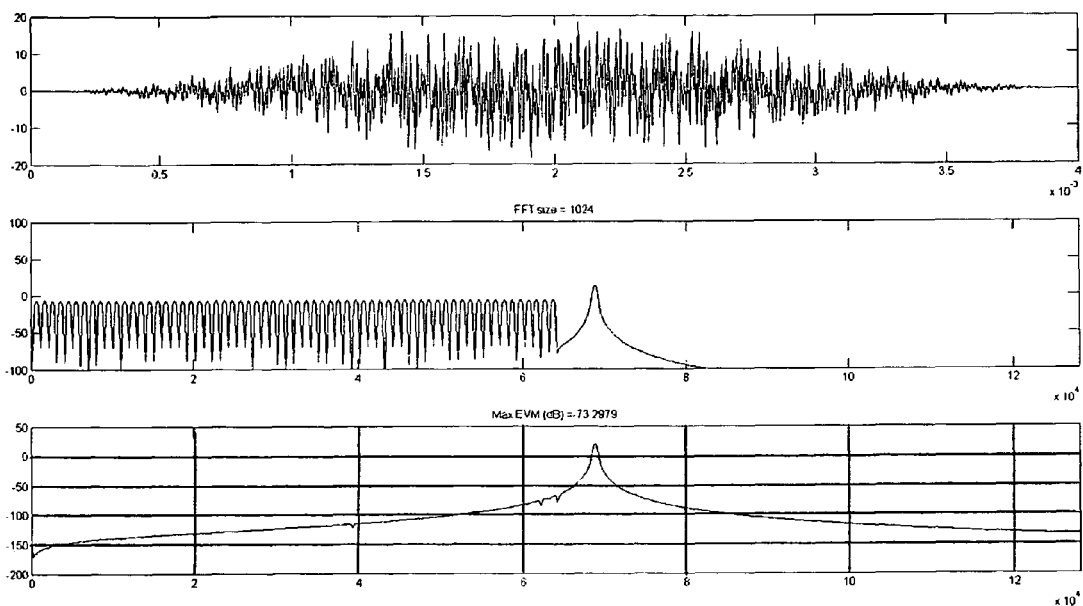

FIG. 14 is a plot showing tremendous improvement in error vector magnitude (EVM) when time windowing is turned on within the FFT period as per embodiments of the patent. The bottom graph shows an error vector magnitude (EVM) plot when an interfering tone is present at 20.5 subcarriers-spacing above the highest used subcarrier. A spectrum of the OFDM signal along with the interfering signal is shown in the middle graph. A time domain waveform of the signal is shown in the top graph for one FFT period.

DETAILED DESCRIPTION

Introduction

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Although embodiments of the invention may be described and illustrated herein in terms of mutual capacitance touch sensor panels, it should be understood that embodiments of this invention are not so limited, but are additionally applicable to self-capacitance sensor panels, and both single and multi-touch sensor panels, and other sensors, in which multiple simultaneous stimulation signals are used to generate a composite sense signal. Furthermore, although embodiments of the invention may be described and illustrated herein in terms of double-sided ITO (DITO) touch sensor panels, it should be understood that embodiments of the invention are also applicable to other touch sensor panel configurations, such as configurations in which the drive and sense lines are formed on different substrates or on the back of a cover glass, and configurations in which the drive and sense lines are formed on the same side of a single substrate.

Overview of Multi-Stimulus Multi-Touch Capacitive Touch Controller of Prior Art

Figure 1:
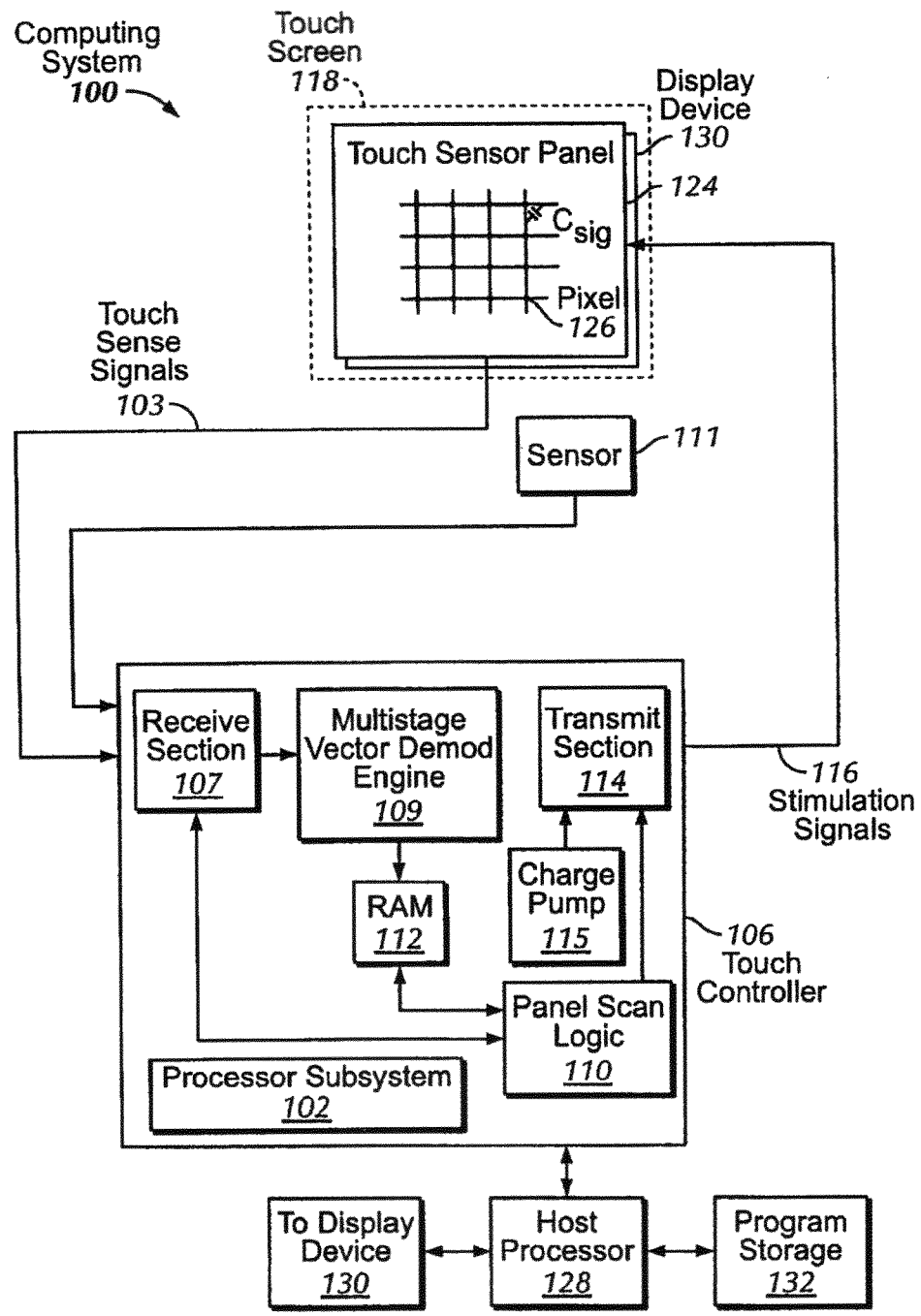
FIG. 1 illustrates an example touch computing system according to embodiments of the invention.

FIG. 1 illustrates example computing system 100 that utilizes a single-ASIC multi-touch controller 106 with integrated drive system. Touch controller 106 is a single application specific integrated circuit (ASIC) that can include one or more processor subsystems 102, which can include, for example, one or more main processors, such as ARM9 68 processors or other processors with similar functionality and capabilities. However, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, a receive section 107 for receiving signals, such as touch sense signals 103 of one or more sense channels (not shown), other signals from other sensors such as sensor 111, etc. Touch controller 106 can also include, for example, a demodulation section such as multistage vector demodulation engine 109, panel scan logic 110, and a drive system including, for example, a transmit section 114. Panel scan logic 110 can access RAM 112, autonomously read data from the sense channels and provide control for the sense channels In addition, panel scan logic 110 can control transmit section 114 to generate stimulation signals 116 at various frequencies and phases that can be selectively applied to rows of a touch sensor panel 124.

A charge pump 115 can be used to generate the supply voltage for the transmit section. The stimulation signals 116 (Vstim) that can have amplitudes higher than the maximum voltage the ASIC process can tolerate by cascading transistors. Therefore, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of row traces (e.g., drive lines) and a plurality of column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. The row and column traces can be perpendicular to each other, although other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. The host processor 128 can be a separate component from touch controller 106, as shown. The host processor 128 can be included as part of touch controller 106. The functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like. [0029] The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
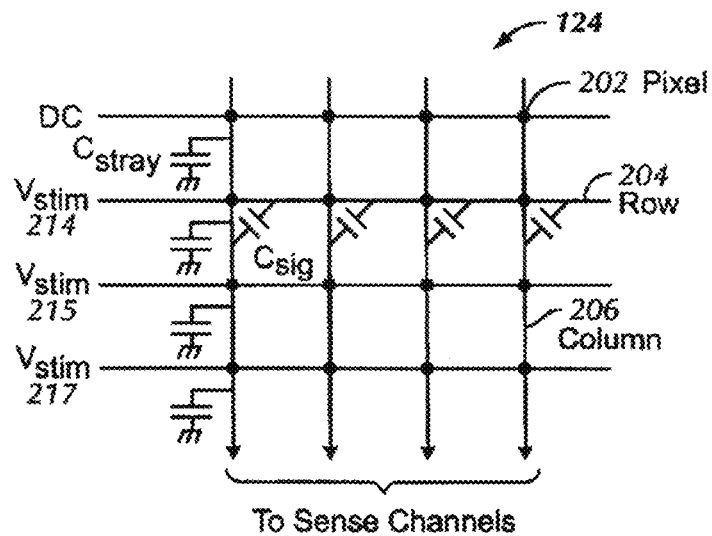
FIG. 2a illustrates an exemplary mutual capacitance touch sensor panel.

FIG. 2a is a partial view of example touch sensor panel 124 that shows more detail. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, drive signals transmitted by transmit section 114 can be applied to the rows of touch panel. For example, AC stimulus Vstim 214, Vstim 215 and Vstim 217 can be applied to several rows, while other rows can be connected to DC. Vstim 214, Vstim 215 and Vstim 217 have a common single carrier or are baseband signals (in embodiments of this patent as described later, these signals can have single or multiple orthogonal subcarriers with single sideband or double sideband modulation and with predetermined phases). Each stimulation signal on a row can cause a charge Qsig to be injected into the columns through the mutual capacitance present at the affected pixels, where:

$$Qsig=Csig*Vstim \quad (1)$$

A change in the injected charge (Qsig_sense) can be detected when a finger, palm or other object is present at one or more of the affected pixels. Vstim signals 214, 215 and 217 can include one or more bursts of single or multiple sine waves that could be time windowed for pulse shaping to limit out of band spectrum. Vstim signals could be comprised of signals with predetermined phase, amplitude and frequency but could be composite in nature, e.g. can be comprised of multiple 'frequency domain orthogonal' single tone signals, each having a specific phase, amplitude and frequency, with the frequency separation between the tones being an integer multiple of the minimum tone spacing Δf. Each signal component could be frequency hopped each frame, phase or amplitude modulated at a frame rate. For example, amplitude modulation can be used for windowing purposes to provide a stimulus signal that is narrow band and has little harmonic content as to prevent unwanted noise sources to enter the receive channel, or to enter the subcarrier frequency bin of the attached sensor amplifier that is used for self-capacitance measurement. Note that although FIG. 2a illustrates rows 204 and columns 206 as being substantially perpendicular, they need not be so aligned, as described above. Each column 206 can be connected to a sense channel, for example.

Figure 2B:
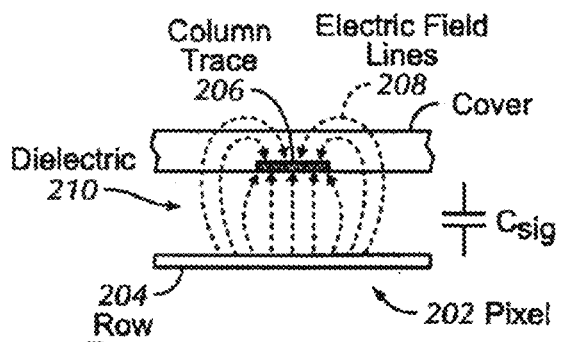
FIG. 2b is a side view of an exemplary pixel in a steady-state (no-touch) condition.

FIG. 2b is a side view of example pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
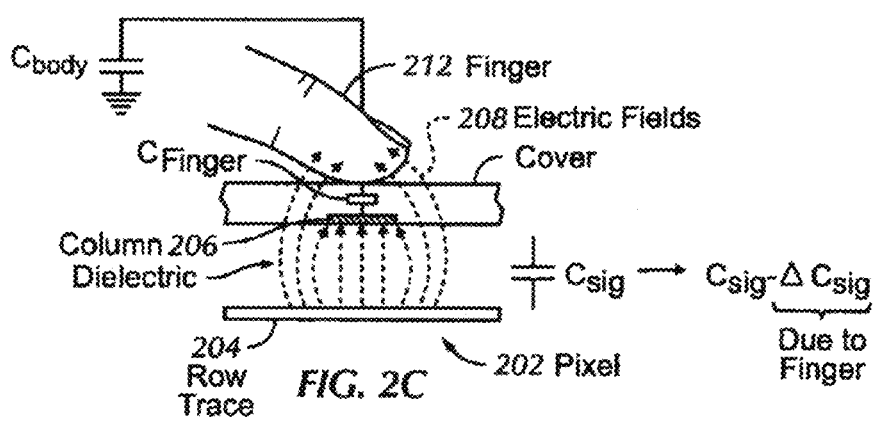
FIG. 2c is a side view of an exemplary pixel in a dynamic (touch) condition.

FIG. 2c is a side view of example pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (e.g., a range from "no-touch" to "full-touch").

DETAILED DESCRIPTION OF THE PATENT EMBODIMENTS

Figure 3A:
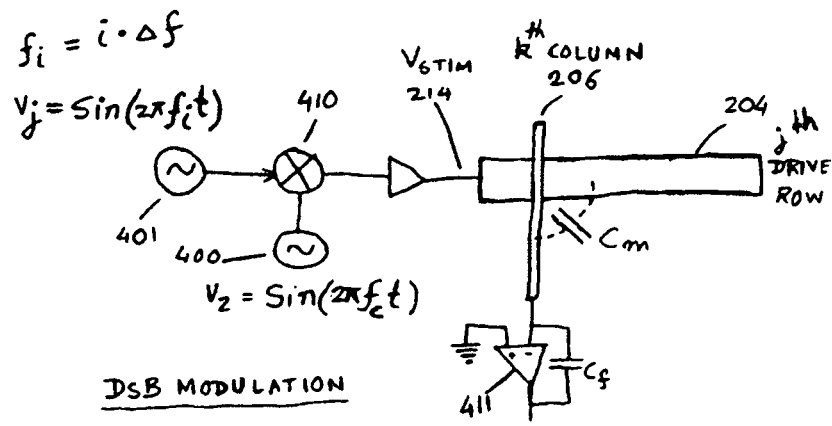
FIG. 3A shows a single drive electrode signal generation using Double Side Band (DSB) modulation for OFDM according to embodiments of the invention.
Figure 3B:
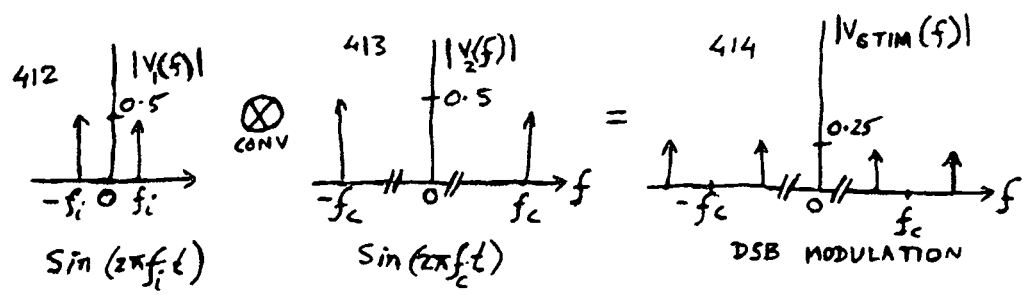
FIG. 3B shows an associated spectrum for the DSB modulation of FIG. 3A, using concept of convolution in frequency domain to explain the spectrum.

According to this invention, an equivalent carrier modulated OFDM signal is used to excite the capacitive touch panel, and this can be done either separately or simultaneously for both mutual and self-capacitance. The advantage of carrier modulated OFDM signal is that large FFT sizes are not required if the carrier frequency is made agile and is able to cover a large frequency band in order to avoid interferences. Each drive electrode is statically or dynamically allocated one (or more) baseband tone frequency that is up converted using a common carrier frequency, to form an un-modulated subcarrier of the OFDM signal. Complex up-conversion using quadrature mixing with in-phase and quadrature-phase carriers results in a single sideband modulation (SSB). In a preferred embodiment a much simpler double sideband (DSB) modulation is performed using real multiplication with a single phase carrier. It results in each drive channel occupying two (or more) frequency tones equally spaced above and below the carrier. This allows the carrier frequency to operate closer to the upper frequency limits of the panel where the tones above the carrier would result in significant attenuation. However, because each drive electrode also has one (or more) subcarrier tone below the carrier, less than half the power would be lost at the most. FIG. 3A shows a double sideband (DSB) modulation where a low-frequency tone signal is multiplied with a carrier sine wave. The associated spectrum of signal components is shown in FIG. 3B, where the DSB modulation spectrum on the right is a convolution of the two spectra on the left.

Using complex down conversion to baseband at each sensor will give access to both the upper and lower sideband information for each drive electrode. If one of the sideband is jammed due to interference at that particular frequency, then the other sideband can still be used for touch decoding. Such an embodiment shown in FIG. 8B for the measurement unit.

Figure 3C:
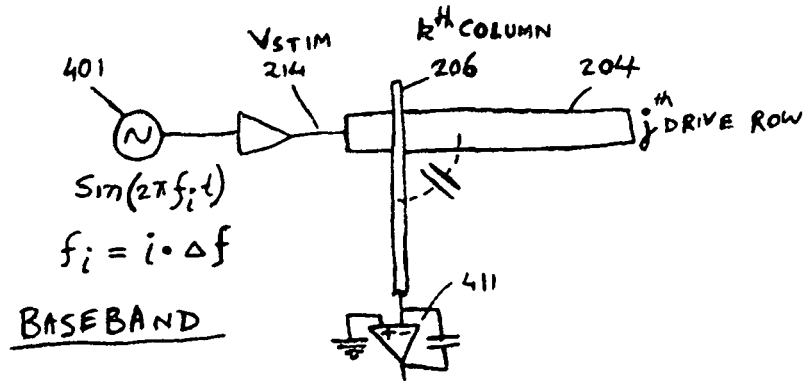
FIG. 3C shows a single drive electrode signal generation for baseband OFDM according to embodiments of the invention.
Figure 4A:
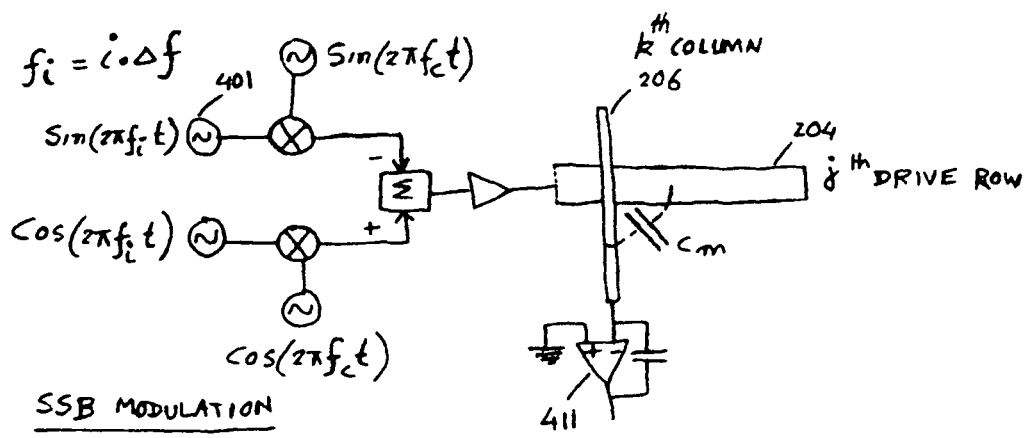
FIG. 4A shows a single drive electrode signal generation using Single Side Band (SSB) modulation for OFDM according to embodiments of the invention.
Figure 4B:
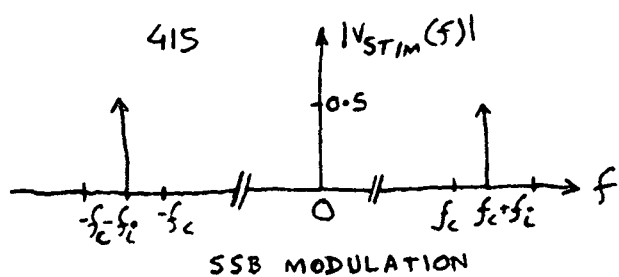
FIG. 4B shows an associated spectrum for the SSB modulation of FIG. 4A.

FIG. 3C shows the drive signal generation for a baseband OFDM system for touch decoding, for which the carrier frequency is 0 Hz. FIG. 4A shows the drive signal generation for a SSB modulated OFDM system for touch decoding using the upper sideband, and FIG. 4B shows the associated spectrum of the SSB signal.

Figure 5A:
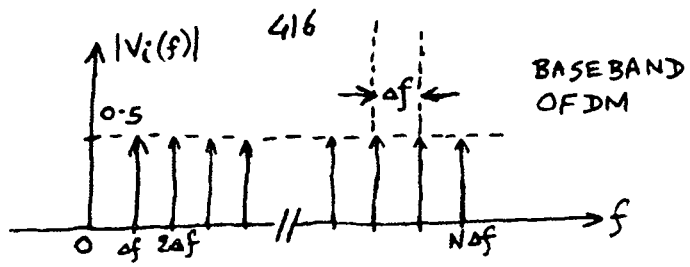
FIG. 5A shows a baseband OFDM positive-frequency spectrum for all drive electrode signal added together at a receive electrode.
Figure 5B:
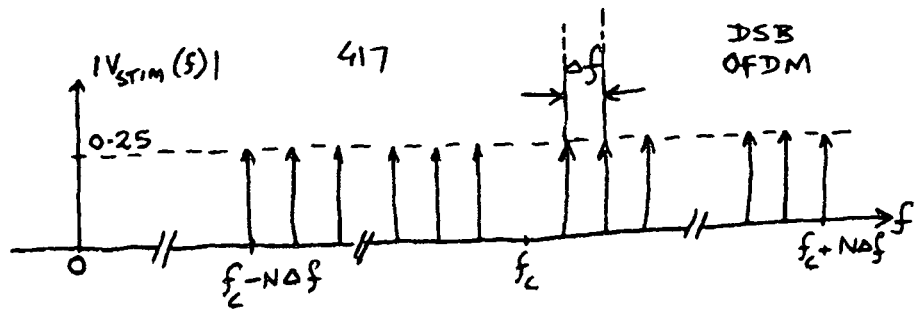
FIG. 5B shows a DSB modulated OFDM positive-frequency spectrum for all drive electrode signals added together at a receive electrode.
Figure 5C:
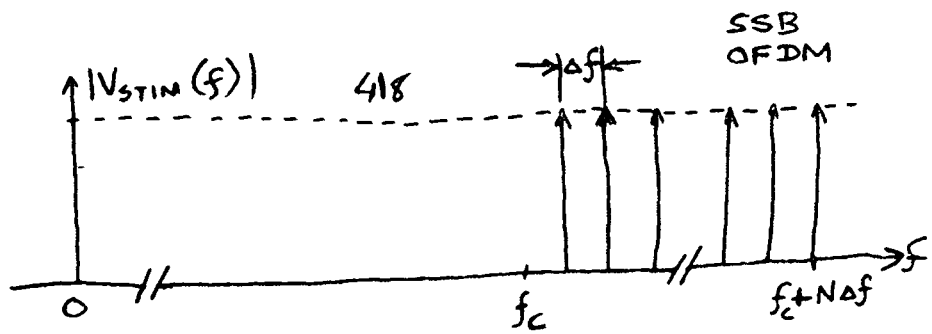
FIG. 5C shows a SSB modulated OFDM positive-frequency spectrum for all drive electrode signals added together.

FIG. 5A shows a positive-frequency spectrum of a baseband OFDM system with a tone spacing of $\Delta f$. FIG. 5B shows a positive-frequency spectrum of a DSB modulated OFDM system for touch decoding. Each drive electrode will occupy spectrum above and below the carrier frequency. FIG. 5C shows a positive-frequency spectrum of SSB modulated OFDM system where the upper sideband is used.

Figure 8A:
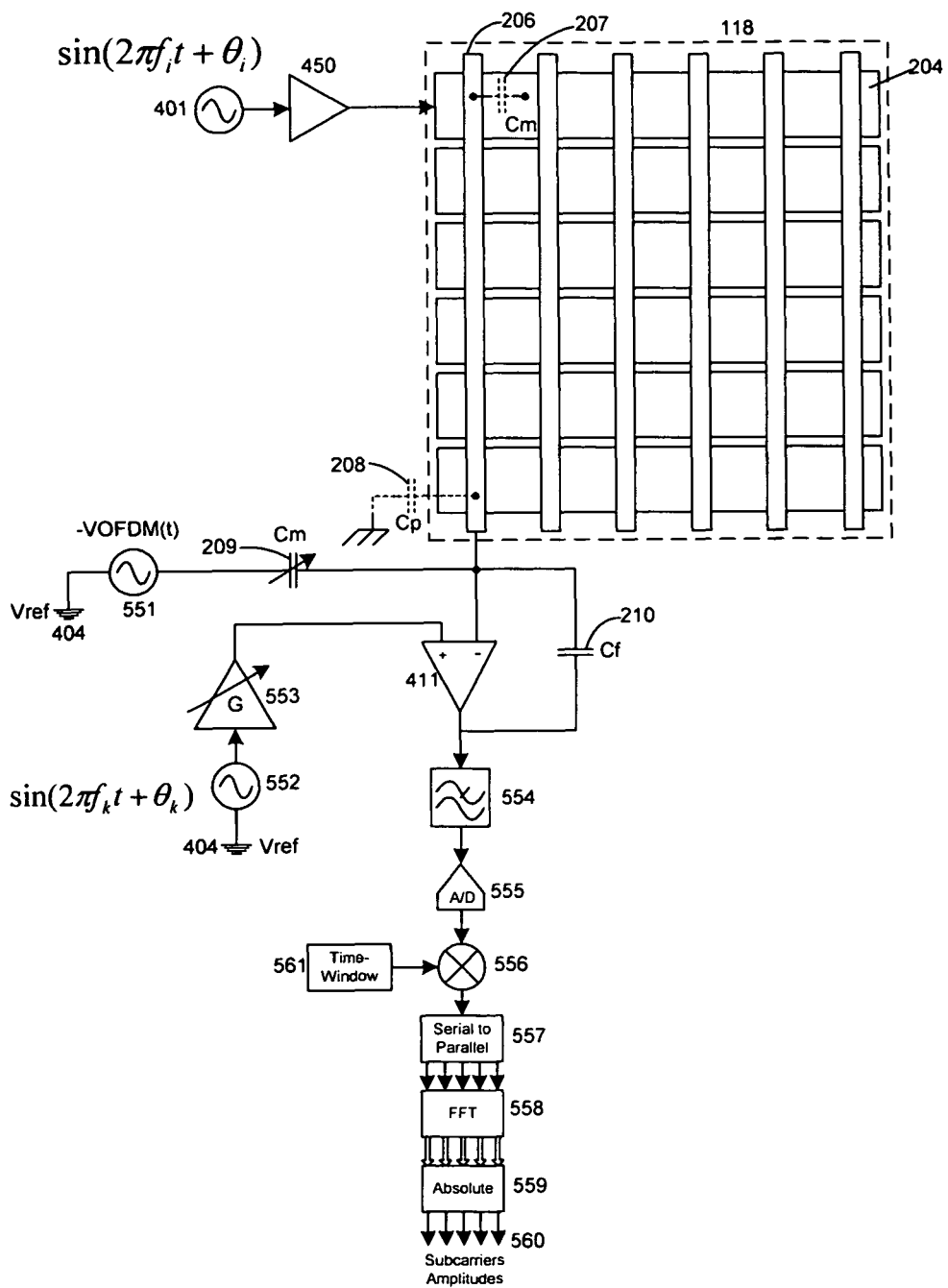
FIG. 8A shows block diagrams and equations for a baseband OFDM system according to embodiments of the invention.
Figure 8B:
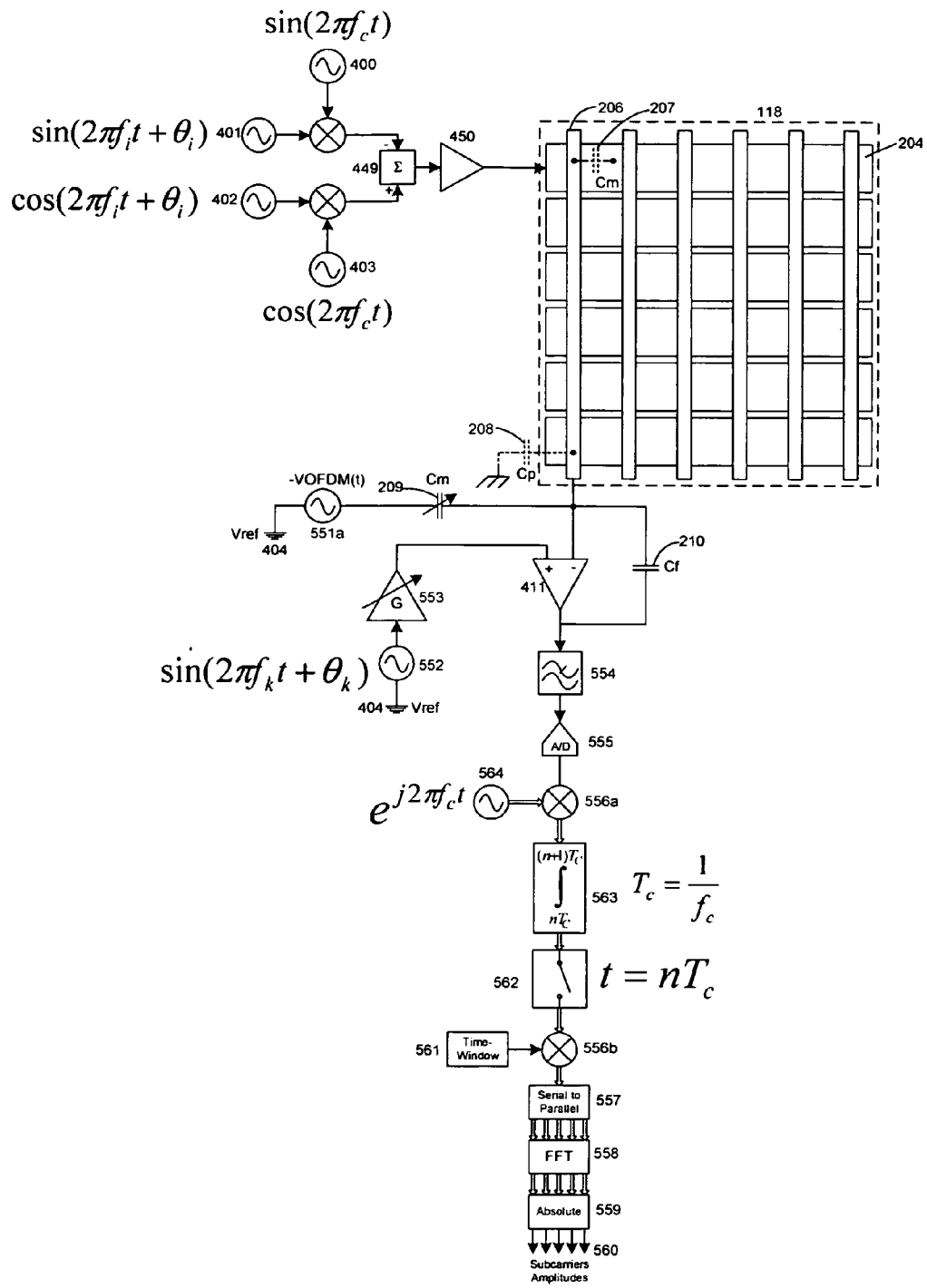
FIG. 8B shows block diagrams and equations for a SSB OFDM system according to embodiments of the invention.

The block diagrams of the OFDM based touch controller system are shown in FIGS. 8A and 8B. A panel 118 comprises a touch surface with a plurality of drive electrodes, and a plurality of receive electrodes. Inside 118, a mutual capacitance between drive electrode and sense electrode is shown for as capacitor Cm between drive electrode 204 and sense electrode 206. Also shown is self-capacitance Cp 208 of receive electrode 206. The remaining components in FIGS. 8A and 8B comprise an electronic subsystem which comprises of a plurality of drive amplifiers, a plurality of sense amplifiers, and an analog and digital signal processing unit. Each figure shows the signal processing around just one drive electrode 204 and one receive electrode 206. Though not explicitly shown, the corresponding signal processing is repeated for each drive electrode and receive electrode. Optimization at the hardware level and the actual hardware implementation details are not shown. FIG. 8A depicts baseband signal injection onto the drive electrodes 204 and is a special case of FIG. 8B when the carrier frequency $f_c$=0 in FIG. 8B. A baseband tone $\sin(2\pi f_i t + \theta_i)$ 401 is injected on the drive electrode at frequency $f_i$ such that $f_i$ is integer multiple of a common frequency spacing $\Delta f$. It is used for measuring the mutual capacitance Cm 207 between drive electrode 204 and receive electrode 206. The phase $\theta_i$ of each drive electrode is chosen to reduce the PAPR of the sum of all the drive signals that appear at the output of each of the receive electrodes. The receive electrode 206 has a self-capacitance Cp 208 to ground as shown in FIG. 8A. It is measured by injecting a signal 552 through an amplifier 553 with gain G, into operational amplifier 411 as shown. The operational amplifier 411 is configured to be a current to voltage converter using a feedback capacitance Cf that is used to convert the sensor current signal into voltage. Injected into this amplifier is an on chip generated signal −VOFDM(t) 551 that is PAPR optimized and it cancels out to a large extent the sensor signal, thereby improving the headroom requirement for this amplifier and the following digitizer and filter. The base band VOFDM(t) signal 551 in FIG. 8A is given as an example by $$VOFDM(t) = \sum_{i=1}^{R} \sin(2\pi f_i t + \theta_i) + \sin(2\pi f_k t + \theta_k)$$

where i is the drive electrode integer index ranging from 1 to R, $f_i=\Delta f*D_i$ is the drive frequency for the $i^{th}$ drive electrode for measuring its mutual capacitance, $D_i$ is a unique frequency index positive integer assigned to the $i^{th}$ drive electrode, R is the number of drive electrodes, and $f_k=\Delta f*S_k$ is a frequency for measuring the self-capacitance Cp of $k^{th}$ sense electrode, $S_k$ is a unique frequency index positive integer assigned to the $k^{th}$ receive electrode, and $S_k$ is different from all $D_i$ and could be common to all receive electrodes. $\theta_i$ is a predetermined phase of the $i^{th}$ drive signal and is chosen to reduce the peak to average power ratio (PAPR) of the signal of the sensor electrode 206 feeding to amplifier 411. This signal of the sensor electrode 206 feeding to amplifier 411 would ideally be equal to VOFDM(t) minus the self-capacitance measurement cancellation signal $\sin(2\pi f_k t + \theta_k)$. Gain and phase variation of the individual drive signals due to the touch panel has been neglected, but could be included in the equation for VOFDM (t). A fixed gain scaling of Cm/Cf is present between the drive electrode voltage input and sense amplifier 411 output. In order to cancel the nominal drive signal sum at input of 411, the cancellation signal VOFDM(t) 551 is coupled through a similar capacitance of Cm 209 that is preferably adjustable for accounting for variations of Cm over panel types. For the base band signal VOFDM(t) 551 in FIG. 8A, the frequency indices $D_i$ and $S_k$ takes on large integer values based on their corresponding operating frequency $f_i$ and $f_k$ that can be close to Fs/2 so that $D_i<=Fs/2/\Delta f$ and $S_k<=Fs/2/\Delta f$. The required base FFT size N is large, given by N=Fs/$\Delta f$, with Fs the sampling frequency that must satisfy Nyquist criterion for sampling i.e. Fs must be at least twice larger than the highest operating subcarrier frequency $f_i$ and $f_k$.

$\theta_i \in \{0, \pi\}$ and is given as $$\theta_i = \left(\frac{x_i + 1}{2}\right)\pi,$$

with $x_i \in \{-1, +1\}$ and $[x_i]=[x_1, x_2, x_3, \ldots x_R]$ a complementary code sequence of length a power of 2, but could be truncated to smaller lengths. $\theta_k$ could be included in the set of $\theta_i$ by taking a larger complementary code sequence if needed in the case both self- and mutual-capacitance measurements are done simultaneously, otherwise $\theta_k$ is not included for PAPR reduction. If $\theta_k$ is same for all receive electrode, then it would have a much smaller impact on the PAPR, and could be ignored, even if both self- and mutual-capacitance measurements are done simultaneously.

The gain G of amplifier 553 is approximately set to Cm/(Cc+Cf) with Cc=R*Cm+Cp in order to maintain a similar self-capacitance measurement signal level as the individual levels of the mutual capacitance signals at the output of 411.

An anti-aliasing filter 554 is use before the digitizer 555. The output of the digitizer is multiplied by 556 with a time window 561 that is synchronized to the FFT 558 period each frame. The serial output of this multiplier is converted to parallel by Block 559. The FFT Block 558 accesses the real input signal from 557 and produces the frequency domain information at its output at each subcarrier frequency. The absolute values 560 of the FFT output at each frequency is provided by 559, and it indicates the amplitude of the signal at that frequency. Based on the tones allocated to each drive electrode, the corresponding FFT output is used to decode the touch information for that drive electrode at the given receive electrode. Each response signal is digitized and evaluated using known FFT technique implemented on a microcontroller or other suitable device. The FFT provides a frequency-domain output vector, the elements of which represent the amplitudes of given frequency components of the time-domain response signal over a range of frequencies. The equation for this type of transformation is as follows:

$$X[k] = \sum_{n=1}^{N-1} x(n)e^{-j2\pi kn/N} \quad \text{(Eq. 1)}$$

where:
k=frequency index number
n=sample number in time domain
N=total number of samples in one OFDM FFT period
x[n]=signal sample at time index n
and $A[k]=|X[k]|/(2N)$ is the amplitude of the signal at the $k^{th}$ frequency index (Eq. 2)

Assuming X[k] is complex, to compute all N values of the FFT, $N^2$ complex multiplications and $N*(N-1)$ complex additions are required. Due to the nature of this transformation, selecting the number of samples (N) to be a factor of 2 allows the implementation to be optimized for time. This allows the FFT to be decomposed into smaller FFTs, which in turn reduces the total number of complex multiplications and additions to $N*\log_2(N)$. In one approach, one may analyze the FFT output vector by identifying local peak amplitudes that exceed a given threshold value, where the frequencies at which such local peak amplitudes occur would be expected to correlate with the drive frequencies of the drive signals. Correlating the peak amplitudes with the drive frequencies therefore allows one to associate a given peak amplitude, measured from a given receive electrode, with a given node of the electrode matrix comprising of the mutual capacitance at the intersections of the drive and receive electrodes. For a touch panel with a scan update rate of 100 Hz, up to 10 ms is available each scan for the OFDM FFT period. If the OFDM period is 5 ms, then the subcarrier spacing Δf is ⅕ ms=200 Hz. If up to 128 subcarriers are to be supported, then the occupied band is 128*Δf=25600 Hz at the carrier frequency for SSB modulation, or 2*25600 Hz for DSB modulation. In another approach called the Maximum Likelihood Estimation (MLE), instead of performing the full N-point FFT when only a smaller number of subcarriers (<<N) are used while the number of time samples N is much larger than the number of used subcarriers, |A(k)| is directly computed from Eq. 1 and Eq. 2 for each of the required value of used subcarrier index k.

FIG. 8B shows a SSB modulated OFDM system. It uses quadrature up-conversion of baseband signals 401 and 401 by carriers 400 and 403 for each drive electrode, using a carrier frequency fc, and a baseband frequency fi that is up-converted to an OFDM subcarrier fc+fi. For DSB modulation, one arm of the quadrature of conversion (either the in-phase or the quadrature-phase) can be turned off or not implemented, and in this case two subcarrier frequencies fc+fi and fc−fi are produced. For SSB modulated OFDM system, the $i^{th}$ drive electrode signal in FIG. 8B is given as $V_i(t) = \text{real}[e^{j2\pi f_i t + \theta_i} * e^{j2\pi f_c t}] = \text{real}[e^{j2\pi(f_i+f_c)t+\theta_i}] = \cos[2\pi(f_i+f_c)t+\theta_i]$ further simplifying to $V_i(t) = \cos(2\pi f_i t + \theta_i)*\cos(2\pi f_c t) - \sin(2\pi f_i t + \theta_i)*\sin(2\pi f_c t)$ as depicted in FIG. 8B for the quadrature up-conversion. The phase $\theta_i$ of each drive electrode is chosen to reduce the PAPR of the sum of all the drive signals that appear at the output of each of the receive electrodes.

Denoting $f_i = \Delta f * D_i$ where Δf is the subcarrier frequency spacing, and $D_i$ is a unique frequency index positive integer assigned to the $i^{th}$ drive electrode for measuring its mutual capacitance, with i the drive electrode index ranging from 1 to R, R the number of drive electrodes, and $f_k = \Delta f * S_k$ is a frequency for measuring the self-capacitance Cp of $k^{th}$ receive electrode, with $S_k$ a positive integer different from all of $D_i$ and could be common to all receive electrodes, the corresponding cancellation signal 551a in FIG. 8B is given as $$VOFDM(t) = \text{real}\left[\sum_{i=1}^{R} \exp(j2\pi(f_i+f_c)t+\theta_i)\right] + \sin(2\pi f_k t + \theta_k)$$

In a simple case, $D_i$ can be equal to i−1 i.e. $0<=D_i<=R-1$, and $S_k$ can be set to R and common to all receive electrodes, and the FFT size can be next power of two greater than equal R+1. In general, $0<=D_i<=R'-1$, and $0<=S_k<=R'-1$, where R' is selected to be greater than R (and usually a power of 2 for simplifying FFT implementation), in order to allow for unused subcarrier frequencies where interference may be present. For SSB modulation, the integer frequency indices $D_i$ and $S_k$ can have negative and positive values, for example in the range: $-R'/2<=D_i<=R'/2-1$ and: $-R'/2<=S_k<=R'/2-1$ where R' is preferably a power of 2, and is larger than the sum of the number of drive electrodes and receive electrode such that each of them is given a unique integer frequency index. The base FFT size N is equal to R' and is much smaller than Fs/Δf that is required for base band systems like in FIG. 8A. For self-capacitance sensing, all receive electrodes could use a common frequency $f_k = \Delta f * S$, S=constant integer, since the coupling between these electrodes are very small with Op Amp 411 maintaining a virtual ground at the receive electrode connection at its input. In this case R would be greater than the number of transmit electrodes plus 1. The number of total subcarriers and the equivalent order N of the FFT can be chosen larger than the minimum required for all the electrodes in order for allowing unused subcarrier frequencies to be allocated to in-band frequencies that have strong interference.

$\theta_i$ is a predetermined phase of the $i^{th}$ drive signal and is chosen to reduce the peak to average power ratio (PAPR) of the signal of the sensor electrode 206 feeding to amplifier 411. This signal would ideally be equal to VOFDM(t). Gain and phase variation of the individual drive signals due to the touch panel has been neglected, but could be included in the equation for VOFDM(t). A fixed gain scaling of Cm/Cf is present between the drive electrode voltage input and sense amplifier 411 output. In order to cancel the nominal drive signal sum at input of 411, the cancellation signal VOFDM(t) 551a is coupled through a similar capacitance of Cm that is preferably adjustable for accounting for variations of Cm over panel types.

$\theta_i \in \{0, \pi\}$ and is given as $$\theta_i = \left(\frac{x_i+1}{2}\right)\pi,$$

with $x_i \in \{-1, +1\}$ and $[x_i]=[x_1, x_2, x_3, \ldots x_R]$ a complementary code sequence of length a power of 2, but could be truncated to smaller length. $\theta_k$ could be included in the set of $\theta_i$ by taking a larger complementary code sequence if needed in the case both self- and mutual-capacitance measurements are done simultaneously, otherwise $\theta_k$ is not included for PAPR reduction. If $\theta_k$ is same for all receive electrode, then it would have a much smaller impact on the PAPR, and could be ignored, even if both self- and mutual-capacitance measurements are done simultaneously.

The gain G of amplifier 553 is Cm/(Cc+Cf) with Cc=R*Cm+Cp in order to maintain a similar self-capacitance measurement signal level as the individual levels of the mutual capacitance signals at the output of 411.

The phases θi for each drive electrode subcarrier in FIGS. 8A and 8B are optimized for PAPR reduction of the OFDM signal. These phases are based on a complimentary code sequence according to an embodiment of the invention.

In FIG. 8B the signal processing on the measurement unit is similar to that in FIG. 8A except that the digitizer sampling frequency is chosen to either oversample the carrier wave or perform complex subsampling. As an example for the oversampled case, the sampling frequency is set to 4 fc i.e. four times the carrier frequency. Quadrature sampling is performed from the real samples of the digitizer by using time polarity control as follows:

In-phase: multiply the digitizer output consecutive samples by the repetitive sequence 1,0,−1,0 . . . (repeated)
Quadrature Phase: multiply the digitizer output consecutive samples by the repetitive sequence 0,−1,0,1 . . . (repeated)
The above is equivalent to multiplying with a $\cos(2\pi f_c t)$ and a $-\sin(2\pi f_c t)$ quadrature local oscillators at a frequency $f_c$ with a sampling frequency of $4*f_c$. The two output sampled data streams comprising of the in-phase and the quadrature-phase signals, can be considered a single complex valued data stream. The general complex down conversion to baseband is implemented by the blocks 556a and 564 in FIG. 8B. The complex down conversion output also contains a $2f_c$ image frequency terms that need to be low-pass filtered and removed in case single-quadrature down-conversion is used. This is filtering done for free by an Integrate and Dump block that integrates the signal over each period of the carrier signal given by $T_c=1/f_c$. This output is decimated by sampler 562 if required (based on the digitizer sampling frequency) and then optionally time-windowed by the blocks 561 (window function) and 556b (multiplier) for interference rejection. The complex serial data stream is converted to parallel by 557, after which an FFT is performed by 558, and then the absolute value of the FFT output is taken using 559 with output 560. These absolute values 560, one at each subcarrier frequency index, are used for the touch decoding as they are linearly dependent on the mutual capacitance for corresponding drive electrodes, and self-capacitance for the sense electrode.

In one embodiment the drive signals are periodically switched off while a spectral analysis is performed at the sensor electrodes using an FFT process. Interference frequencies are identified around the carrier within the FFT bandwidth, and these frequencies are then not allocated to the drive electrodes. The FFT size used is larger than the number of drive electrodes in order to have spare subcarriers that are also reasonably separated from the interfering signals. This frequency separation can be significantly reduced based on an embodiment described later using windowing inside the FFT period.

In one embodiment, based on the location of touch from either finger or stylus, the corresponding drive electrodes that cover the region of interest on the panel surrounding the finger or stylus, are allocated subcarrier frequencies that have lower interference levels as determined through the spectral analysis method.

Figure 6:
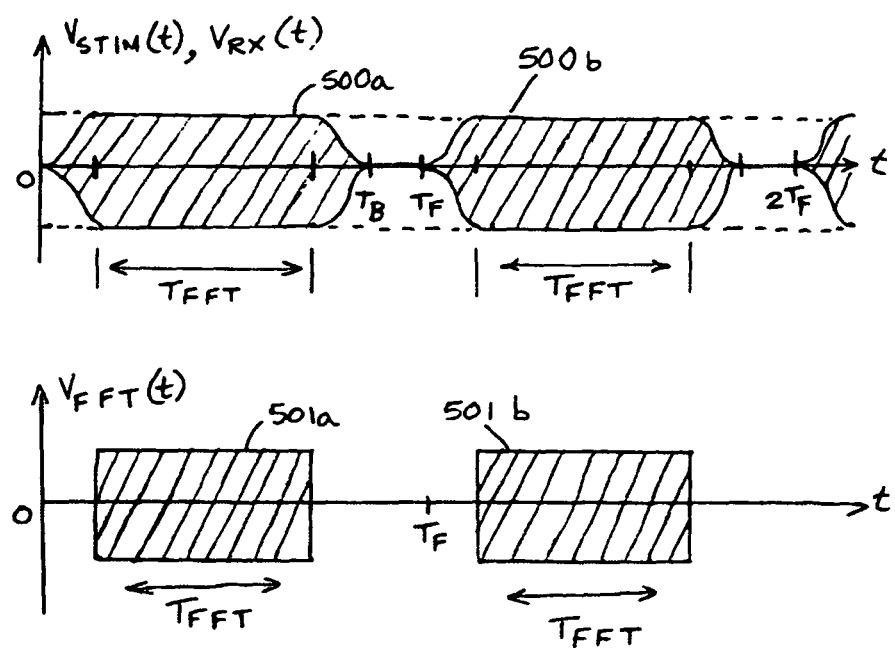
FIG. 6 shows an envelope of the drive electrode signal in the top graph, and a corresponding sub-section of the signal used for the FFT in the lower graph, according to embodiments of the invention.
Figure 7:
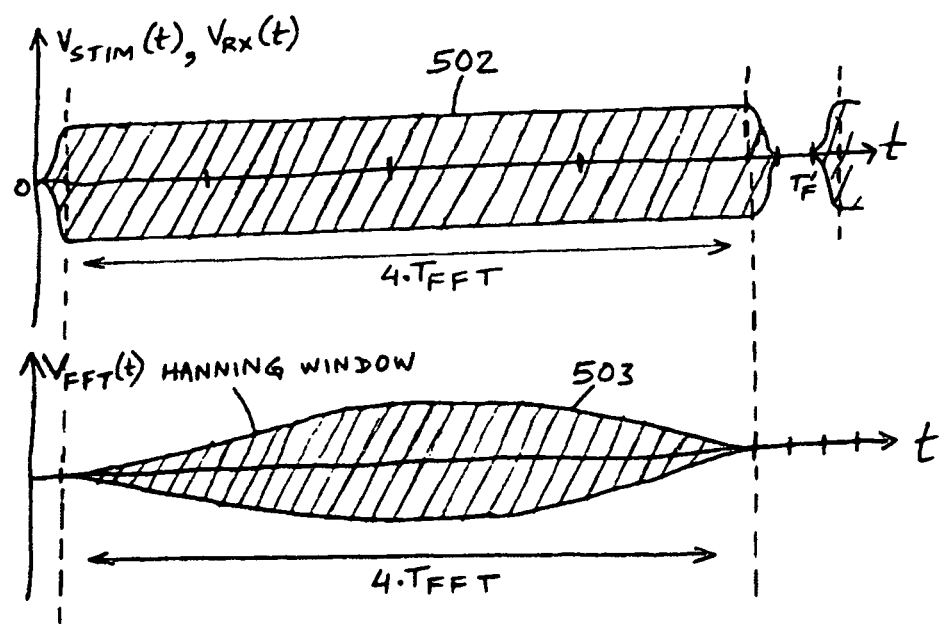
FIG. 7 shows an envelope of the drive electrode signal in the top graph, when a time windowing as shown in the lower graph is used inside the FFT window, according to embodiments of the invention.

In another embodiment, time-windowing is performed inside the FFT period using a windowing function like the Hann window. This enables the occupied band of the OFDM signal to be very close to interfering frequencies while at the same time ensuring that there is no noticeable impact on the SNR (signal to noise ratio), thereby making available a wider range of usable subcarrier frequencies for which the SNR is acceptable. The time-windowing creates inter-carrier interference (ICI) among adjacent subcarriers due to broadening of the main lobe of each of their spectrum. In order to overcome this, only every fourth subcarrier is used i.e. only every fourth subcarrier is allocated to a drive electrode, and the FFT size is increased by a factor four by increasing the signal duration by a factor 4×. This results in insignificant ICI even for very severe time-windowing that is fully contained inside each FFT period. The combination of time-windowing (e.g. Hann window) and subcarriers skipping (e.g. using every $4^{th}$ subcarrier) allows strong interfering signals to occupy frequencies inside the OFDM band without significantly degrading the system performance. This technique drastically improves the interference immunity of a multi-touch sensing system. In general, depending on the type of time-windowing, every $N^{th}$ subcarrier can be non-zero (i.e. used), with N>1. For the Hann window, N=4 or greater results in negligible ICI. FIG. 6 shows the drive signal and the associated FFT sample-period over $T_{FFT}$ duration, without time-windowing. FIG. 7 shows how the time-windowing is done inside the extended FFT period. In FIG. 6, an OFDM signal frame or symbol duration is shown starting at 0 sec and ending at $T_F$, and is slightly longer than $T_{FFT}$. In FIG. 7, the FFT sample-period has been extended by a factor of four using a longer duration of signal. This has an effect of 4× frequency up sampling in order to allow for spectral broadening of the used subcarriers that occur due to the time-windowing inside the FFT sample-period, e.g. using Hann window (also called Hanning window) as shown.

Various aspects of the invention are illustrated in FIG. 10 through FIG. 14 using SSB modulation, but with a carrier frequency of 0 Hz in order to simplify the plotting of the time-signals and its spectrum for the purpose of illustration only. Spectral broadening of the used subcarriers due to the time-windowing is shown in FIG. 13, while the signals without the time-windowing i.e. without the corresponding spectral broadening, are shown in FIGS. 10 through 12. In FIG. 12 an interference tone 20 dB above a subcarrier level is placed 20.5 subcarrier spacing (i.e. 20.5*Δf) above the OFDM signal band edge. The composites spectrum is shown in the middle graph. The lower graph shows the EVM (error vector magnitude) in dB, of the used subcarriers. The worst-case EVM of a very high and an unacceptable level of −17.7 dB occurs at the upper band edge of the OFDM signal. EVM at the $k^{th}$ subcarrier is defined as:

$$EVM(k) = 20 * \log_{10}\left(\frac{|\Delta A(k)|}{A(k)}\right) dB \quad \text{(Eq. 3)}$$

where $\Delta A(k)$ is the amplitude error of the $k^{th}$ subcarrier with an original amplitude of $A(k)$ By using time-windowing inside the FFT period (as shown in FIG. 13 for the OFDM signal without interference), the EVM with interference can be drastically improved to larger negative values i.e. error amplitude $\Delta A(k)$ reduced significantly, as shown in FIG. 14 lower graph. The amplitude error $\Delta A(k)$ occurs due to spectral leakage from interfering signals. For the same interference, the EVM is now −73 dB as shown in FIG. 14, when the time-windowing is used. The middle graph shows the spectrum and the lower graph shows the EVM that is normalized to a used subcarrier signal level. The absolute value of A(k)/ΔA(k) at each subcarrier is equal to SNR for that subcarrier, and SNR(dB)=−EVM. The time-windowing of the input signal is shown by the blocks 561 and 556 in FIG. 8A and by 561 and 556*b* in FIG. 8B. The time-windowing is done prior to the FFT operation using a time-domain multiplier. However, as is known in the art, it can also be done in the frequency domain using convolution after the FFT operation.

While the above mentioned embodiments using time-windowed OFDM signals offer great advantages, an inherent drawback of OFDM signals in general is that they have a very large peak to average power ratio (PAPR) that can exceed 20 dB for large number of drive electrodes or used subcarriers. Such a system is not feasible for handheld products that are sensitive to battery life, since the sensor amplifier would require a huge signal handling dynamic range (e.g. greater than 20 dB) with significant power consumption. An embodiment of this patent is to reduce the dynamic range of the OFDM signal from a very large value to just 3 dB, thereby significantly reducing the dynamic range requirement of the sensor amplifiers. This is done by phase encoding each active subcarrier tone (that is used by a drive electrode) with a predetermined value that is based on a complimentary code sequence. If the number of drive electrodes are a power of two, then the peak to average ratio of the composites signal as seen by each sensor amplifier is only 3 dB if the tone allocation is done monotonically and uniformly (independent of the number of null tones between active subcarriers), based on the complimentary code sequence. Even if the number of drive electrodes is not a power of two, the PAPR is only a few dB larger than 3 dB. In another embodiment of the patent, a search is made over the complimentary code sequence to find the lowest PAPR when the number of drive electrodes is not a power of two. A major advantage of using complimentary code sequence based phase encoding is that even with large phase shifts over the panel the PAPR does not increase significantly.

Generation of typical complimentary code sequence in Matlab® or FreeMat language is shown below in Table 1. The array 'phasesSave' contains a sequence of phases values that are either 0 or π radians. The length of the array is NFFT which is the number of active tones used for channel sounding i.e. for all the drive electrodes. Preferably NFFT is a power of two so that the PAPR is 3 dB for the envelope of the signal (or 2 to 3 dB higher for the real signal).

TABLE 1

```
% complementary code based phases
a0=[1]; b0=[1];
a1=horzcat(a0,b0); b1=horzcat(a0,-b0);
a2=horzcat(a1,b1); b2=horzcat(a1,-b1);
a3=horzcat(a2,b2); b3=horzcat(a2,-b2);
a4=horzcat(a3,b3); b4=horzcat(a3,-b3);
a5=horzcat(a4,b4); b5=horzcat(a4,-b4);
a6=horzcat(a5,b5); b6=horzcat(a5,-b5);
a7=horzcat(a6,b6); b7=horzcat(a6,-b6);
a8=horzcat(a7,b7); b8=horzcat(a7,-b7);
a9=horzcat(a8,b8); b9=horzcat(a8,-b8);
a10=horzcat(a9,b9); b10=horzcat(a9,-b9);
a11=horzcat(a10,b10); b11=horzcat(a10,-b10);
% Convert selected Complementary Code sequence to phase (0 or pi)
phasesSave=pi*(-a11'+1)/2;
phasesSave=phasesSave(1:NFFT); % select phase sequence for NFFT
points
```

In one embodiment of the patent, for the case when NFFT is not a power of two, then a search is made over a longer complimentary code sequence taking NFFT contiguous elements from the sequence to find the lowest PAPR. A typical Matlab® or FreeMat code performing this search is shown below in Table 2.

TABLE 2

```
R=64; % number of active tones
skip=1; % every "skip" tone is used, with skip-1 null tones inbetween
S=1; % frequency factor of 1st used tone above DC (set to > skip/2 so 1st
used tone has fully symmetric spectrum)
FstepActiveTones=1000; % frequency spacing between active tones
Fstep=FstepActiveTones/skip; % FFT tone spacing in Hz, also
fundamental tone
NFFT=2^nextpow2((S+R*skip+integer_offset)*2) % FFT size
Tfft=1/Fstep; % FFT period
Fs=Fstep*NFFT; % base sampling frequency
Tstep=1/Fs; % base sampling time step
t=0:Tstep:Tfft-Tstep; % time points array for an FFT period
Lt=length(t); % number of time points in FFT's period = NFFT
Vtones=zeros(R,Lt); % memory allocation for time domain signals
(active_tones x time_points)
for ii=1:NFFT/2-R,
   selectPhase=zeros(1,R);
   selectPhase(1:R)=phasesSave(ii:ii+R-1);
   %% Add complementary code based phases to zero-phase unmodulated
       OFDM
   freqarray=(S:skip:S+(R-1)*skip)*Fstep;
   for k=1:R,
      Ftone=(S+(k-1)*skip)*Fstep;
      Vtones(k,:)=sin(2*pi*Ftone*t+selectPhase(k));
   end;
   %% Transmit OFDM Signal 24  Vcol=sum(Vtones); % add all tone
   signals for composite OFDM transmit signal in time domain
      rms=(sum(Vcol.^2)/length(Vcol))^0.5;
      pk=max(abs(Vcol))
      crest_dB=20*log10(pk/rms)
      PAPR(ii)=crest_dB;
end;
%% Select min PAPR
[C,ii]=min(PAPR);
selectPhase(1:R)=phasesSave(ii:ii+R-1);
for k=1:R,
   Ftone=(S+(k-1)*skip)*Fstep;
   Vtones(k,:)=sin(2*pi*Ftone*t+selectPhase(k));
end;
```

Complimentary phase based phase encoding of OFDM Signal 24 has been used in wireless communication over a long time. Details and References can be found in the book "OFDM for wireless communications systems" by Ramjee Prasad. US patent 586 2182 shows how to use complimentary code based PAPR reduction for OFDM based wireless data communications. The PAPR reduces by 7.5 dB for 16 subcarriers, and by 12 dB for 64 subcarriers when complimentary code based phase encoding is used.

FIG. 10 shows an OFDM signal with 64 subcarriers. The carrier frequency is 0 Hz in order to simplify the illustration of the signals. It has a 21 dB PAPR as seen in the middle graph. By using the complimentary code based phase encoding, the PAPR has been reduced to 5.6 dB as shown in FIG. 11 middle graph. Similar performance is achieved for OFDM signal with non-zero carrier frequency, using either DSB or SSB modulation.

For touch decoding it is only required to track the changes in the mutual or self-capacitance relative to a longer term averaged value that corresponds to the case when there is no touch. Therefore the touch decoding would not be affected if a fixed amount of signal is added or subtracted at each subcarrier frequency that is injected onto a sensor line through the mutual capacitance of the corresponding drive electrode. This is because the FFT operation on the time domain OFDM signal at the sensor is a linear operation for extracting the individual signal levels at each subcarrier. An embodiment of this patent is to subtract from the composites OFDM signal that is sensed by the amplifiers at the sensor electrodes, a nearly equal and opposite OFDM signal that is produced from data stored in memory. This only works for small PAPR and does not work for large PAPR since large spikes in the OFDM signal have large phase variations that are difficult to accurately predict and subtract. Another embodiment of the patent is to specifically combine the PAPR reduction of the OFDM signal along with the subtraction of the stored OFDM waveform that closely resembles the touch panel signal at the input of the sensor amplifier.

FIG. 8A and FIG. 8B show how to subtract out a PAPR optimized OFDM signal –VOFDM(t) 551 or 551*a* from the nearly identical received PAPR optimized OFDM signal at the sensor. The waveform 551 or 551*a* is generated from stored data that can be pre-computed. The sensor signal is the sum of all the drive electrode signals. Each drive electrode tone signal is given a predetermined phase based on complimentary code sequence for PAPR reduction. The subtraction signal –VOFDM(t) can optionally also include a term to cancel out the tone that is use for the self-capacitance measurement that is done through amplifier 553 and tone generator 552 in FIGS. 8A and 8B.

One of the limitations of OFDM is the requirement of rather low levels of phase noise even at very small offsets from the carrier frequency (e.g. down to 5% of tone spacing from the subcarrier). In one embodiment of the patent the same carrier signal is used for the drive electrodes as well as for the sensor down conversion to baseband or for the sampling of the sensor signal. This allows the receiver carrier phase to track the transmit carrier phase without using conventional carrier phase tracking and phase locked loops to clean up the close-in phase noise. The delay between the transmit carrier and the receive carrier is deliberately kept at zero so that the phase noise cancels out. In the prior art the receive carrier is delayed to compensate for the panel phase shifts. Even the transmit drive electrodes signals are sometimes appropriately delayed to compensate for the phase variation along the sensor trace. Using OFDM there is no need for this delay compensation, and the drive electrode up-convertor carrier phase, and the sensor electrode down-convertor carrier phases can be kept at zero phase relative to an internal reference phase. This does not affect the operation of quadrature demodulation at the sensor if the quadrature local oscillators are generated from a lookup table instead of delaying one with respect to the other. If a direct analog oscillator is used for the up and down conversion, then a high-frequency LC frequency or phase locked oscillator followed by a divide by N can be used. This will give 6N dB improvement in phase noise relative to the oscillator phase noise.

For passive stylus support one option is to have a high density of drive and sensor electrodes for example using a 2.5 mm pitch. This can result in a huge number of electrodes but they can be easily supported using the above-mentioned OFDM techniques using a large number of subcarriers. In one embodiment of the patent, alternate drive electrodes are excited in even numbered frames, while the other set of alternate drive electrodes are excited in order numbered frames. This reduces the number of required subcarrier frequencies by a factor two, thereby reducing the complexity of the touch controller integrated circuit. In another embodiment when a stylus is detected or the device put into a stylus mode, only the drive electrodes around the stylus touch area are excited, thereby significantly reducing the number of subcarriers. This allows higher drive levels for the active drive electrodes for a given sensor dynamic range, and results in a large improvement in SNR for the passive stylus. The position of the passive stylus can be tracked easily in a closed loop control system if the stylus is not moving fast, in order to selectively turn on the required drive electrodes with a few frames of delay in the closed loop tracking. However if the stylus is moving fast, then a predictive algorithm is used to turn on the drive electrodes in anticipation of the future position of the stylus (i.e. to compensate for the loop delay of the closed loop control system).

In another embodiment of the patent, instead of increasing the drive level of the active electrodes that follow a region of interest around the passive stylus, more subcarriers could be allocated to those electrodes. This can help with interference mitigation through frequency diversity. PAPR could be reduced for these electrodes using complimentary code based phase encoding, thereby maximizing the electrode drive level when it uses multiple subcarriers.

In another embodiment of the patent, both self and mutual capacitance are sensed simultaneously or sequentially in order to support passive stylus while at the same time enable regular touch detection without having to change the operating mode manually between a touch mode and a stylus mode. The self-capacitance would be primarily used to detect the passive stylus, and the information from the mutual capacitance can be used to enhance the touch accuracy especially if the drive electrodes are selectively turned on and made to track the passive stylus. The limitation of self-capacitance is that it only works reliably for a single touch, but this is not an issue with stylus. The measurement of self-capacitance method is shown in FIGS. 8A and 8B using the blocks 411, 552 and 553. Block 552 injects a tone into an unused subcarrier frequency $f_k$ with a predetermined phase $\theta_k$ that is based on complimentary code PAPR reduction method and can be part of a longer sequence of $\theta_i$ that would include the phases of subcarriers for self-capacitance measurements and the phases of subcarriers for mutual-capacitance measurements. The output of 411 at this frequency $f_k$ is an indication of the receive electrode capacitance Cc=R*Cm+Cp, where R=number of drive electrodes, Cm=mutual capacitance, Cp sensor electrode capacitance to ground. Cc indicates self-capacitance to a large extent for the sensor electrodes.

Figure 9:
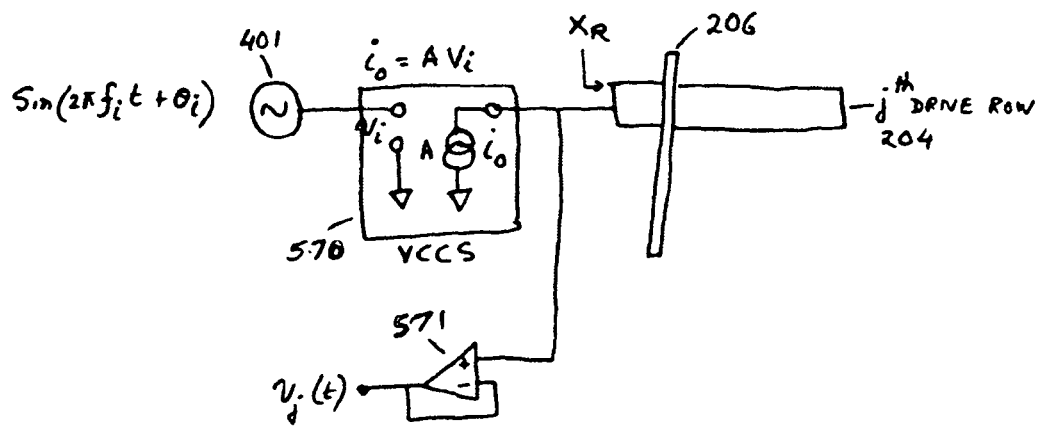
FIG. 9 is a block diagram showing measurement of drive electrode self-capacitance. It can also be used for general self-capacitance measurement of electrodes.

For measuring the self-capacitance of the drive electrode 204, an embodiment is shown in FIG. 9. The drive electrode is driven by a high impedance current source instead of a voltage source, by Voltage Controlled Current Source (VCCS) block 570. The voltage at the drive electrode 204 is measured by voltage follower Op Amp 571 output and it is inversely proportional to the electrode equivalent capacitance $C_R$ to ground, as shown by equations 572 and 573 in FIG. 9.

In another embodiment of the patent, both self- and mutual-capacitance are sensed sequentially or simultaneously, either at full frame rate or a lowered frame rate. The mutual capacitance could be made to operate at full frame rate in a limited region of interest (like the power on slider of 4th generation iPhone), while the self-capacitance could be used for proximity detection to increase the frame rate of the mutual capacitance sensing when proximity is detected.

According to this invention, a separate set of OFDM subcarrier tones are allocated for the self-capacitance measurement of sensors when done simultaneously with the measurement of the mutual capacitance, as depicted in FIGS. 8A and 8B. Using OFDM, it is easier to simultaneously measure the self-capacitance of the sensor electrodes while they are measuring the mutual capacitance. The subcarriers for self-capacitance measurement are different from those for the mutual-capacitance measurement. As an example, the sensor electrode is connected to the inverting input of an operational amplifier (Op Amp) 411 that has a capacitive feedback 210 in order to implement a charged couple amplifier or a current to voltage converter. The inverting input instead of being directly connected to ground (e.g. mid supply voltage or reference voltage), it is driven by a self-capacitance subcarrier tone 552 through amplifier 553. The Op amp output at this frequency would indicate the capacitance to ground, thereby enabling the measurement of self-capacitance. Since this subcarrier frequency is orthogonal to all other subcarriers that are being used, it can be independently detected through the FFT simultaneously with the mutual capacitance subcarrier frequencies that are coupled through the mutual capacitance with the drive electrodes.

In an embodiment of the patent, for two-dimensional positioning of stylus using self-capacitance, the mutual-capacitance measurement drive electrodes are also used for their self-capacitance measurement in order to get the position of the stylus along the corresponding axis. For the self-capacitance measurement, the voltage drivers for mutual-capacitance are turned off (put into high output impedance mode), and a high-impedance current source is turned on. FIG. 9 shows an implementation where the electrode is driven by a high impedance current source of VCCS block 570 during the self-capacitance measurement. The voltage level at the current source output is a measure of the self-capacitance $C_R$, and is sensed by a voltage follower 571. In another embodiment of the patent, the same concept is used for the self-capacitance measurement of the mutual-capacitance sensor electrodes. In this case, the mutual-capacitance measurement charge coupled amplifier is disconnected from the input, or reconfigured into a voltage follower of FIG. 9.

What is claimed is:

1. A touch-sensitive apparatus, comprising:
a panel comprising a touch surface, a plurality of drive electrodes, and a plurality of receive electrodes;
an electronic subsystem comprising a plurality of drive amplifiers, a plurality of sense amplifiers, and an analog and digital signal processing unit;
wherein each drive amplifier is configured to deliver to a corresponding said drive electrode an up-converted drive signal comprising a set of one or more drive frequency tones that are subcarriers around a common carrier frequency; and
wherein each set of said drive frequencies is configured to be disjoint to every other set of drive frequencies of all other said drive electrodes; and
wherein all said drive frequencies in all said sets are configured to be orthogonal to each other such that their separations are selected to be an integer multiple of a common frequency spacing $\Delta f$ that defines the subcarrier spacing of an associated composite carrier modulated orthogonal frequency division multiplexed (OFDM) signal comprising of all said subcarrier frequencies of all the said drive unit signals at said common carrier frequency received at a said receive electrode output; and
wherein the phase of each drive frequency tone is given a predetermined value based on a complementary code sequence that is chosen to reduce the peak to average power of the composite sum of all said drive signals that appear at said receive electrode output as said composite carrier modulated OFDM signal; and
wherein each sense amplifier input is connected to a corresponding said receive electrode to receive said composite carrier modulated OFDM response signal at said common transmitter carrier frequency from its said receive electrode; and
wherein each said sense amplifier output is delivered to said analog and digital signal processing unit which is configured to down-convert said composite carrier modulated OFDM signal with further means to analyze said down-converted response signal to determine therefrom a coupling capacitance between every drive electrode and its corresponding receive electrode using fast Fourier transform (FFT) or maximum likelihood estimation; and
wherein said analog and digital signal processing unit is configured for up-conversion of said drive signals, wherein said up-conversion is selected from a group comprising of (a) an equivalent multiplication between real baseband signal and a real transmitter carrier signal that corresponds to creating a double side-band (DSB) modulated signal, and (b) an equivalent complex multiplication between a complex baseband signal and a complex transmitter carrier signal with the real output of the complex product taken that corresponds to creating a single side-band (SSB) modulated signal, and wherein each said complex baseband signal, said complex carrier signal and said complex product comprises of in-phase and quadrature-phase components, and (c) other known methods of up-conversion of signals including up-conversion of a SSB or DSB modulated intermediate frequency signal to a carrier frequency; and
wherein said analog and digital signal processing unit is configured for down-conversion of said sense electrode signal wherein said down-conversion is selected from a group comprising (a) an equivalent multiplication between said signal at said transmitter carrier frequency and a real single-phase local un-modulated carrier signal at the same carrier frequency, followed by filtering and sampling, (b) an equivalent multiplication between said signal at said transmitter carrier frequency and a complex in-phase and quadrature-phase local un-modulated carrier signal at the same carrier frequency, followed by filtering and sampling, and (c) oversampling of said signal and separating the time samples into an in-phase and a quadrature-phase path, followed by suitable low pass filtering for removal of unwanted frequency components.

2. The apparatus of claim 1, wherein said analog and digital signal processing unit is configured to enable the subtraction of a stored waveform from each of said receive electrode wanted signal at said sensor amplifier input or output in order to reduce the absolute level of said wanted signal that is amplified and digitized, thereby reducing said digitizer quantization errors and additionally enabling extra headroom for unwanted interfering signals to be linearly processed for subsequent rejection without being clipped and thereby without desensitizing said wanted signal, and thereby not creating unwanted harmonics that could potentially fall near or in the same frequency bins of said wanted signal.

3. The apparatus of claim 1, wherein a spacing of $M*\Delta f$ is kept between adjacent physically used drive frequencies; and
wherein M is chosen to be an integer greater than or equal 2 and is independently selected for each gap between said physically used adjacent subcarriers; and
wherein a time-windowing of receive signal is implemented by said analog and digital signal processing unit for enabling amplitude modulation of the time signal at the input of said FFT block, thereby reducing spectral leakage from interfering signals and thereby improving signal to noise ratio (SNR) of used subcarriers; and wherein the length of each said time-window is selected to be one FFT duration of $1/\Delta F$; and wherein said time-window is selected from a group consisting of sine-squared, raised-cosine, Harm, Hamming, Blackman, Chebychev, Tukey and other types of windowing functions that are generally known in the art for mitigating spectral leakage; and wherein the number of total subcarriers, length N of the number of FFT time samples and the size of the FFT, for a given number of said physically used subcarriers, are configured to be appropriately increased for accommodating an increased total number of unused subcarriers for providing said $M*\Delta f$ spacing between said physically used subcarriers thereby reducing interference due to spectral leakage between them when said time-windowing is used.

4. The apparatus of claim 1, wherein the subcarrier spacing is greater than 30 Hz, and wherein the number of drive frequencies is at least four, and wherein the carrier frequency is greater than 25 kHz.

5. The apparatus of claim 1, wherein the carrier frequency is 0 Hz.

6. A touch-sensitive apparatus, comprising:

a panel comprising a touch surface, a plurality of drive electrodes, and a plurality of receive electrodes;

an electronic subsystem comprising a plurality of drive amplifiers, a plurality of sense amplifiers, and an analog and digital signal processing unit;

wherein each drive amplifier is configured to deliver to a corresponding said drive electrode an up-converted drive signal comprising a set of one or more drive frequency tones that are subcarriers around a common carrier frequency; and wherein each set of said drive frequencies is configured to be disjoint to every other set of drive frequencies of all other said drive electrodes; and wherein all said drive frequencies in all said sets are configured to be orthogonal to each other such that their separations are selected to be an integer multiple of a common frequency spacing $\Delta f$ that defines the subcarrier spacing of an associated composite carrier modulated orthogonal frequency division multiplexed (OFDM) signal comprising of all said subcarrier frequencies of all the said drive unit signals at said common carrier frequency received at a said receive electrode output; and wherein each sense amplifier input is connected to a corresponding said receive electrode to receive said composite carrier modulated OFDM response signal at said common transmitter carrier frequency from its said receive electrode; and wherein each said sense amplifier output is delivered to said analog and digital signal processing unit which is configured to down-convert said composite carrier modulated OFDM signal with further means to analyze said down-converted response signal to determine therefrom a coupling capacitance between every drive electrode and its corresponding receive electrode using fast Fourier transform (FFT) or maximum likelihood estimation; and wherein said analog and digital signal processing unit is configured for up-conversion of said drive signals, wherein said up-conversion is selected from a group comprising of (a) an equivalent multiplication between real baseband signal and a real transmitter carrier signal that corresponds to creating a double side-band (DSB) modulated signal, and (b) an equivalent complex multiplication between a complex baseband signal and a complex transmitter carrier signal with the real output of the complex product taken that corresponds to creating a single side-band (SSB) modulated signal, and wherein each said complex baseband signal, said complex carrier signal and said complex product comprises of in-phase and quadrature-phase components, and (c) other known methods of up-conversion of signals including up-conversion of a SSB or DSB modulated intermediate frequency signal to a carrier frequency; and wherein said analog and digital signal processing unit is configured for down-conversion of said sense electrode signal wherein said down-conversion is selected from a group comprising (a) an equivalent multiplication between said signal at said transmitter carrier frequency and a real single-phase local un-modulated carrier signal at the same carrier frequency, followed by filtering and sampling, (b) an equivalent multiplication between said signal at said transmitter carrier frequency and a complex in-phase and quadrature-phase local un-modulated carrier signal at the same carrier frequency, followed by filtering and sampling, and (c) oversampling of said signal and separating the time samples into an in-phase and a quadrature-phase path, followed by suitable low pass filtering for removal of unwanted frequency components; and wherein a spacing of $M*\Delta f$ is kept between adjacent physically used drive frequencies; and wherein M is chosen to be an integer greater than or equal 2 and is independently selected for each gap between said physically used adjacent subcarriers; and wherein a time-windowing of receive signal is implemented by said analog and digital signal processing unit for enabling amplitude modulation of the time signal at the input of said FFT block, thereby reducing spectral leakage from interfering signals and thereby improving signal to noise ratio (SNR) of used subcarriers; and wherein the length of each said time-window is selected to be one FFT duration of $1/\Delta f$; and wherein said time-window is selected from a group consisting of sine-squared, raised-cosine, Hann, Hamming, Blackman, Chebychev, Tukey and other types of windowing functions that are generally known in the art for mitigating spectral leakage; and wherein the number of total subcarriers, length N of the number of FFT time samples and the size of the FFT, for a given number of said physically used subcarriers, are configured to be appropriately increased for accommodating an increased total number of unused subcarriers for providing said $M*\Delta f$ spacing between said physically used subcarriers thereby reducing interference due to spectral leakage between them when said time-windowing is used.

7. The apparatus of claim 6, wherein the phase of each drive frequency tone is given a predetermined value based on a complementary code sequence that is chosen to reduce the peak to average power of the composite sum of all said drive signals that appear at said receive electrode output as said composite carrier modulated OFDM signal.

8. The apparatus of claim 6, wherein said analog and digital signal processing unit is configured to enable the subtraction of a stored waveform from each of said receive electrode wanted signal at said sensor amplifier input or output in order to reduce the absolute level of said wanted signal that is amplified and digitized, thereby reducing said digitizer quantization errors and additionally enabling extra headroom for unwanted interfering signals to be linearly processed for subsequent rejection without being clipped and thereby without desensitizing said wanted signal, and thereby not creating unwanted harmonics that could potentially fall near or in the same frequency bins of said wanted signal.

9. The apparatus of claim 6, wherein said analog and digital signal processing unit is configured to perform said time-windowing in the frequency domain using convolution based methods, after the FFT.

10. A method of determining a plurality of touch locations for touches on a touch panel that are simultaneous or overlapping in time, the method comprising:
providing a panel comprising a touch surface, a plurality of drive electrodes, and a plurality of receive electrodes;
providing an electronic subsystem comprising a plurality of drive amplifiers, a plurality of sense amplifiers, and an analog and digital signal processing unit;
delivering to a said drive electrode through a corresponding said drive amplifier an up-converted drive signal comprising a set of one or more drive frequency tones that are subcarriers around a common carrier frequency;
configuring said analog and digital signal processing unit for up-conversion of said drive signals, wherein said up-conversion is selected from a group comprising of (a) an equivalent multiplication between real baseband signal and a real transmitter carrier signal that corresponds to creating a double side-band (DSB) modulated signal, and (b) an equivalent complex multiplication between a complex baseband signal and a complex transmitter carrier signal with the real output of the complex product taken that corresponds to creating a single side-band (SSB) modulated signal, and wherein each said complex baseband signal, said complex carrier signal and said complex product comprises of in-phase and quadrature-phase components, and (c) other known methods of up-conversion of signals including up-conversion of a SSB or DSB modulated intermediate frequency signal to a carrier frequency;
selecting each set of said drive frequency to be disjoint to every other set of drive frequency of all other said drive electrodes;
selecting all drive frequencies in all sets to be orthogonal to each other such that their separations are an integer multiple of a common frequency spacing M that defines the subcarrier spacing of an associated composite carrier modulated orthogonal frequency division multiplexed (OFDM) signal comprising of all said subcarrier frequencies of all the said drive unit signals at said common carrier frequency received at said receive electrode output;
setting the phase of each drive frequency tone using a predetermined value based on a complementary code sequence that is chosen to reduce the peak to average power of the composite sum of all drive signals that appear at said receive electrode output as said composite carrier modulated OFDM signal;
sensing said receive electrode at corresponding said sense amplifier input and providing corresponding said composite carrier modulated OFDM response signal at said common transmitter carrier frequency at said sensor amplifier output to said analog and digital signal processing unit;
down-converting said composite carrier modulated OFDM signal to baseband by said analog and digital signal processing unit using a single-phase or a complex quadrature-phase down conversion method;
analyzing said down-converted response signal to determine therefrom a coupling mutual capacitance between every drive electrode and its corresponding receive electrode using fast Fourier transform (FFT) or maximum likelihood estimation;
introducing a spacing of M*Δf between adjacent physically used drive frequencies;
choosing M to be an integer greater than or equal 2 and independently selecting it for each gap between said physically used adjacent subcarriers;
performing a time-windowing of receive signal by said analog and digital signal processing unit for enabling amplitude modulation of the time signal at the input of said FFT block, thereby reducing spectral leakage from interfering signals and thereby improving SNR of used subcarriers;
choosing the length of each said time-window to be one FFT duration of 1/Δf;
selecting said time-window from a group consisting of sine-squared, raised-cosine, Hann, Hamming, Blackman, Chebychev, Tukey and other types of windowing functions that are generally known in the art for mitigating spectral leakage;
configuring the number of total subcarriers, length N of the number of FFT time samples and the size of said FFT, for a given number of said physically used subcarriers such that they are all appropriately increased for accommodating an increased total number of unused subcarriers for providing said M*Δf spacing between said physically used subcarriers thereby reducing interference due to spectral leakage between them when said time-windowing is used.

11. The method of claim 10, further comprising of
periodically keeping said drive electrodes at zero output level preferably at a nominal drive impedance;
doing a spectral analysis in said analog and digital signal processing unit by using FFT or by using other means including band-pass filtering, on one or more said receive electrode signals to determine the presence of interfering signals;
identifying said subcarriers frequencies that have spurious signal content above a predetermined amount, as bad subcarriers;
identifying the remaining said subcarrier frequencies as good subcarriers and allocating them to said drive electrodes;
performing a decision based time-windowing wherein if significant interference is present such that not sufficient number of good subcarriers are available for allocation to drive electrodes, then turning on a time-windowing over the FFT duration to improve the signal to noise ratio (SNR) of subcarriers, and increasing the duration of the FFT time interval to get a finer resolution of subcarrier spacing in order to introduce null subcarriers or gaps between used subcarriers as required for supporting said time-windowing that results in widening of the individual subcarrier spectrum, and determining if that helps increase the number of available good subcarriers, and if it does increase the number of good subcarrier frequencies then keeping the said time-windowed FFT technique active, and reallocating the newly found good subcarrier frequencies to said drive electrodes;
changing said carrier frequency to another frequency location if said spectral analysis fails to locate the required number of good subcarriers, and restarting said spectral analysis.

12. The method of claim 10, further comprising of determining a region of interest on said touch panel surrounding said touch location and allocating said drive electrodes that cover said region of interest with subcarrier frequencies that have the lower interference levels and higher SNR among all subcarriers.

13. The method of claim 10, further comprising of
determining a region of interest on said touch panel surrounding said touch location and allocating physically used subcarrier frequencies to corresponding said drive electrodes that cover said region of interest while making other drive electrodes silent by turning off their drive amplifier signal output;
optionally allocating said active drive electrodes of said region of interest more number of subcarriers;
optionally driving said active drive electrodes of said region of interest at a larger signal level than a nominal level for further improved SNR.

14. The method of claim 10, further comprising of determining a self-capacitance of said receive electrodes by injecting one or more orthogonal subcarrier frequencies into the said receive amplifier, wherein these said subcarrier frequencies are different from those used for the said mutual coupling capacitance sensing.

15. The method of claim 10, further comprising of periodically driving said drive electrode with a current source and measuring said drive electrode signal selectively at its allocated subcarrier frequency or frequencies, to determine a self-capacitance of said drive electrode.

16. The method of claim 10, further comprising of sensing either sequentially or simultaneously both a self-capacitance and said coupling mutual capacitance of said sense electrode, either at a full frame rate or at a lowered frame rate, wherein said mutual coupling capacitance sensing could be made to operate at said full frame rate only in a limited region of interest like a power-on slider region of a Smart Phone, while said self-capacitance could be used for proximity detection to increase said frame rate of said mutual capacitance sensing when said proximity is detected.

17. The method of claim 10, further comprising of
driving one group of reduced number of said drive electrodes in even numbered frames, while driving another group of reduced number of said drive electrodes in odd numbered frames in a time multiplexed manner, and sensing said groups through said sense electrodes in said corresponding time frames;
using a reduced number of subcarrier frequencies and a reduced FFT size that are common to all said drive electrode groups, thereby reducing the complexity of said analog and digital signal processing unit.

18. The method of claim 13, further comprising of
determining position of said touch location and tracking said touch location using a closed loop tracking control system;
using a predictive algorithm to turn on said drive electrodes said region of interest in anticipation of the future position of said touch location to compensate for the loop delay of said closed loop control system.

19. The method of claim 10, further comprising of setting said carrier frequency to 0 Hz.

20. The method of claim 10, further comprising of subtracting a stored waveform from each of said receive electrode wanted signal at said sensor amplifier input or output in order to reduce the absolute level of said wanted signal that is amplified and digitized, thereby reducing said digitizer quantization errors and additionally enabling extra headroom for unwanted interfering signals to be linearly processed for subsequent rejection without being clipped and thereby without desensitizing said wanted signal, and thereby not creating unwanted harmonics that could potentially fall near or in the same frequency bins of said wanted signal.

\* \* \* \* \*